(12) United States Patent
Isaksson et al.

(10) Patent No.: US 6,865,232 B1
(45) Date of Patent: Mar. 8, 2005

(54) MULTI-CARRIER TRANSMISSION SYSTEMS

(75) Inventors: Mikael Isaksson, Lulea (SE); Magnus Johansson, Lulea (SE); Harry Tonvall, Lulea (SE); Lennart Olsson, Lulea (SE); Tomas Stefansson, Lulea (SE); Hans Ohman, Lulea (SE); Gunnar Bahlenberg, Lulea (SE); Anders Isaksson, Lulea (SE); Goran Okvist, Lulea (SE); Lis-Marie Ljunggren, Lulea (SE); Tomas Nordstrom, Lulea (SE); Lars-Ake Isaksson, Lulea (SE); Daniel Bengtsson, Lulea (SE); Siwert Hakansson, Lulea (SE); Ye Wen, Lulea (SE)

(73) Assignee: STMicroelectronics N.V., Amsterdam (NL)

( * ) Notice: Subject to any disclaimer, the term of this patent is extended or adjusted under 35 U.S.C. 154(b) by 0 days.

(21) Appl. No.: 09/147,750
(22) PCT Filed: Jul. 15, 1997
(86) PCT No.: PCT/SE97/01277
§ 371 (c)(1),
(2), (4) Date: May 28, 1999
(87) PCT Pub. No.: WO98/10545
PCT Pub. Date: Mar. 12, 1998

(30) Foreign Application Priority Data

Sep. 2, 1996 (SE) .............................................. 9603187

(51) Int. Cl.[7] ........................... H04K 1/10; H04L 27/28
(52) U.S. Cl. .................................................... 375/260
(58) Field of Search ................................ 375/219, 220, 375/222, 259, 260, 261, 354, 356; 370/203, 204, 208, 206, 210

(56) References Cited

U.S. PATENT DOCUMENTS

| | | | | |
|---|---|---|---|---|
| 5,400,322 A | * | 3/1995 | Hunt et al. | 370/468 |
| 5,479,447 A | * | 12/1995 | Chow et al. | 375/260 |
| 5,652,772 A | | 7/1997 | Isaksson et al. | |
| 5,867,528 A | * | 2/1999 | Verbueken | 375/222 |
| 6,064,692 A | * | 5/2000 | Chow | 375/219 |
| 6,072,779 A | * | 6/2000 | Tzannes et al. | 370/252 |
| 6,370,156 B2 | * | 4/2002 | Spruyt et al. | 370/480 |

* cited by examiner

Primary Examiner—Betsy L. Deppe
(74) Attorney, Agent, or Firm—Lisa K. Jorgenson; Allen, Dyer, Doppelt, Milbrath & Gilchrist, P.A.

(57) ABSTRACT

A multi-carrier transmission system has a plurality of transceivers, each having a receiver and a transmitter. Data is transmitted between the transceivers by modulating the data onto a multiplicity of carrier waves in the form of multi-bit symbols, wherein each carrier wave constitutes a channel, and wherein the number of bits per symbol (the bit loading), varies between channels and, within a channel, with time, so that each channel has associated therewith a bit loading parameter. In operation, the multi-carrier system is adapted to synchronously update, at the transceivers, the bit loading parameters associated with each channel by transmission of data over a control channel, in that the control channel is established, at system start-up, on a predetermined one of the multiplicity of carrier waves whose identity is known to the transceivers, and in that the control channel is, after start-up, changed from the predetermined channel to a further channel, selected by the first transceiver on the basis of channel characteristics.

28 Claims, 19 Drawing Sheets

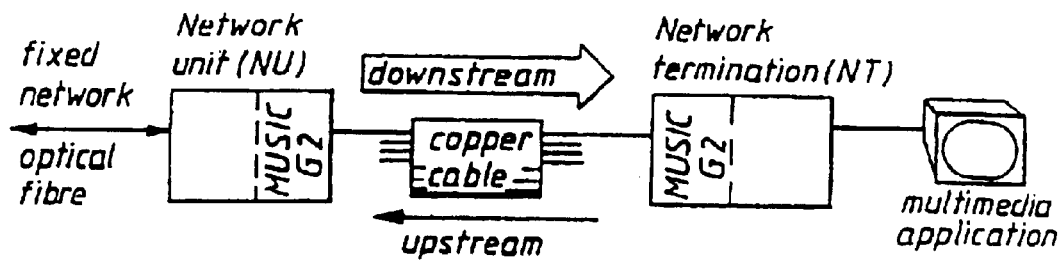
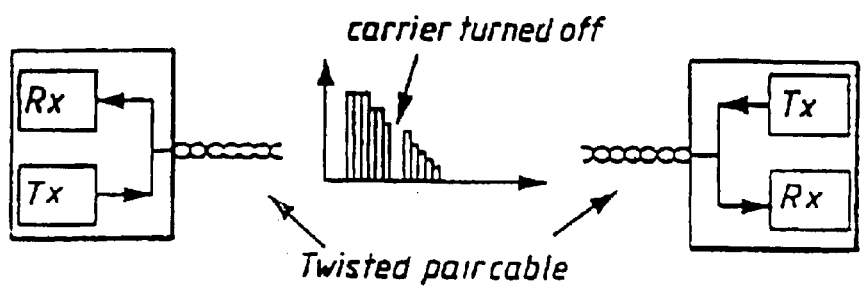
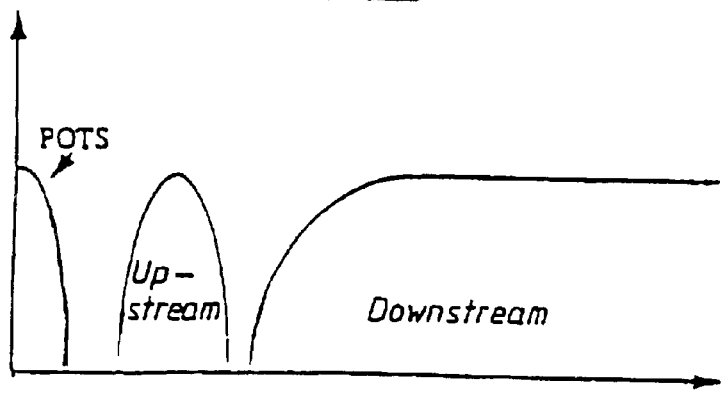

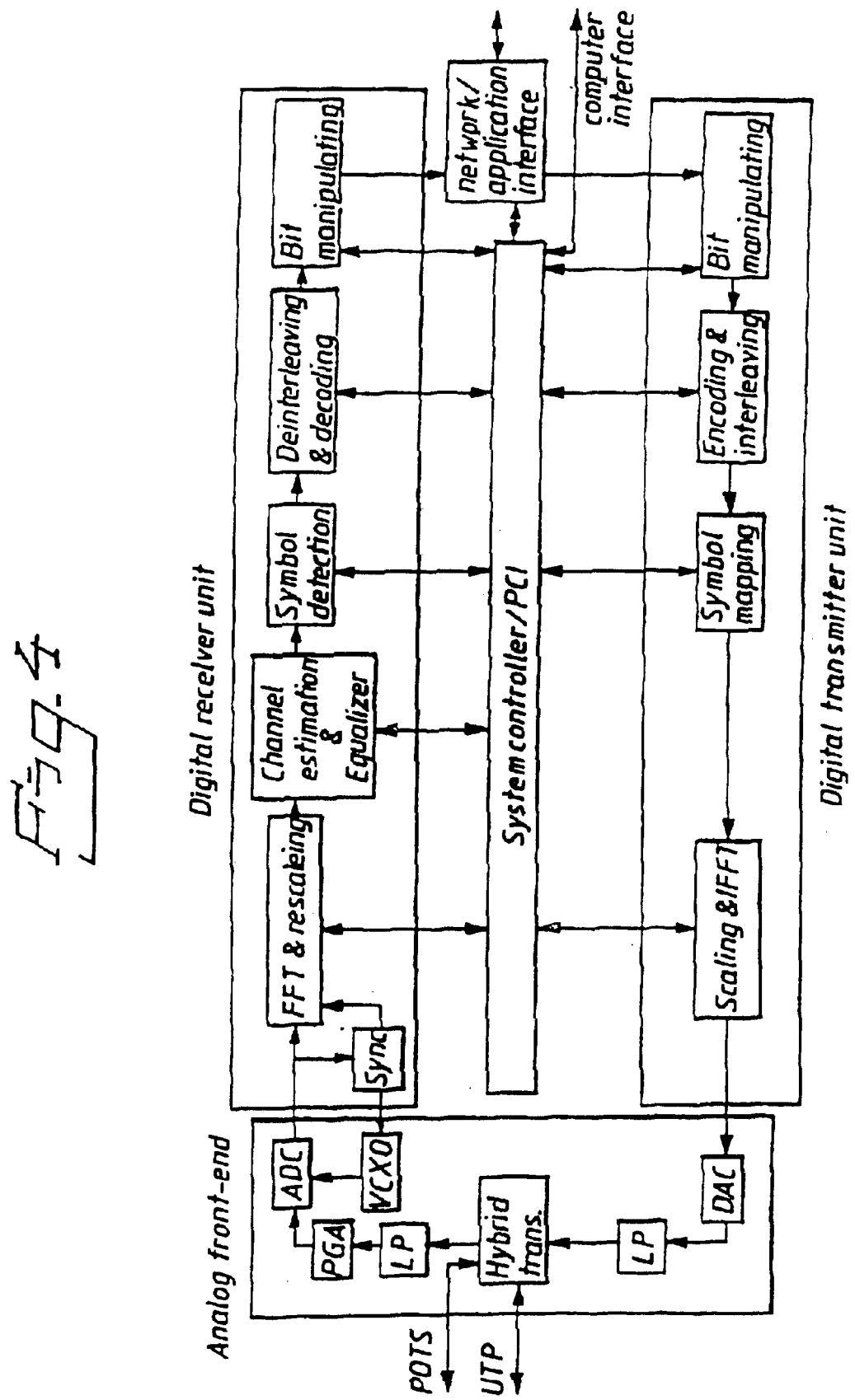

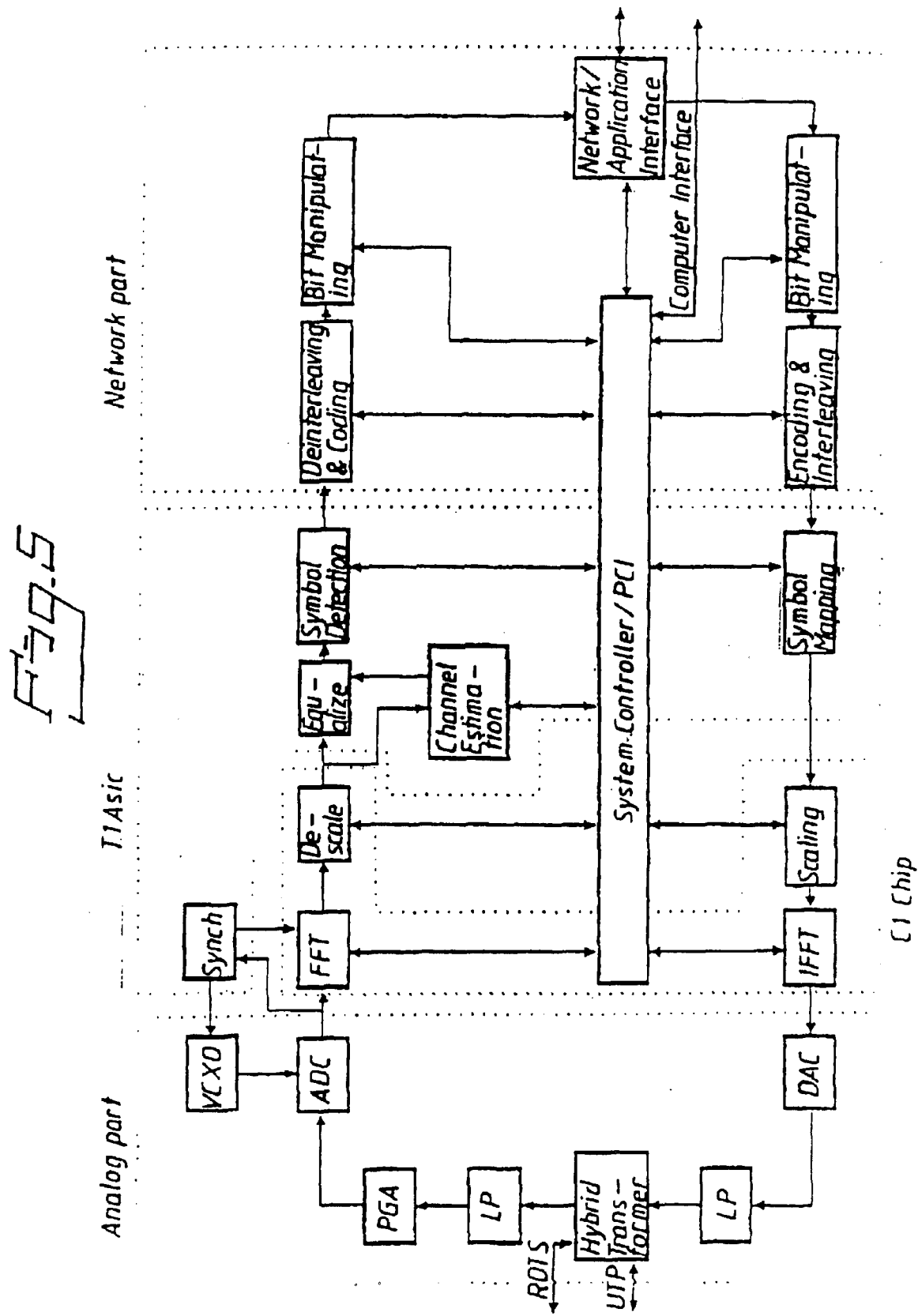

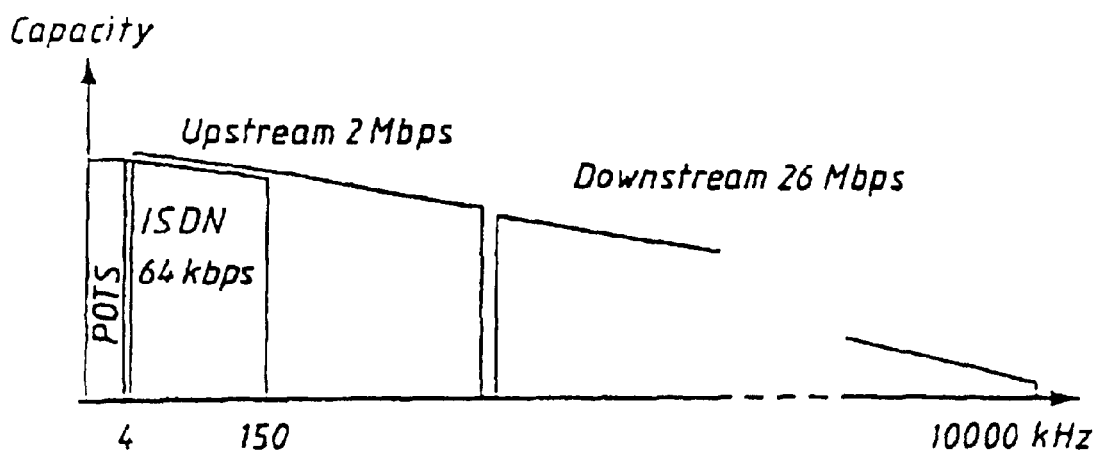
Fig. 6
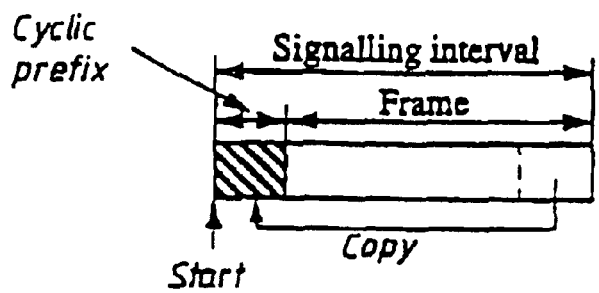
Fig. 7
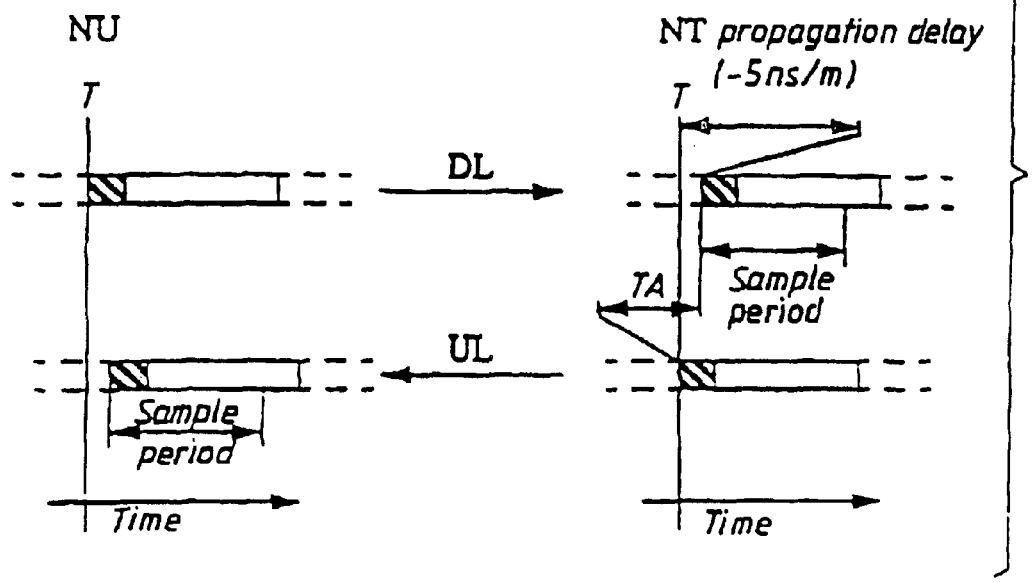

Fig. 11
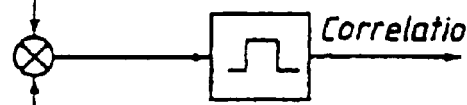
Fig. 12
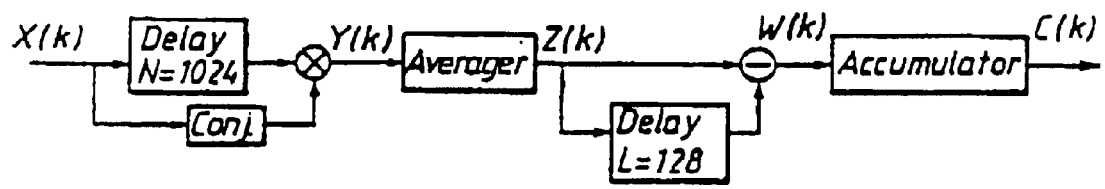
Fig. 13
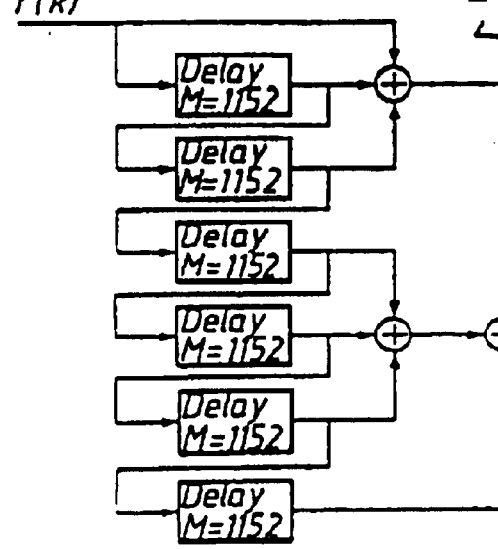
$$Z(k) = \sum_{i=0}^{6} Y(k - iM)$$

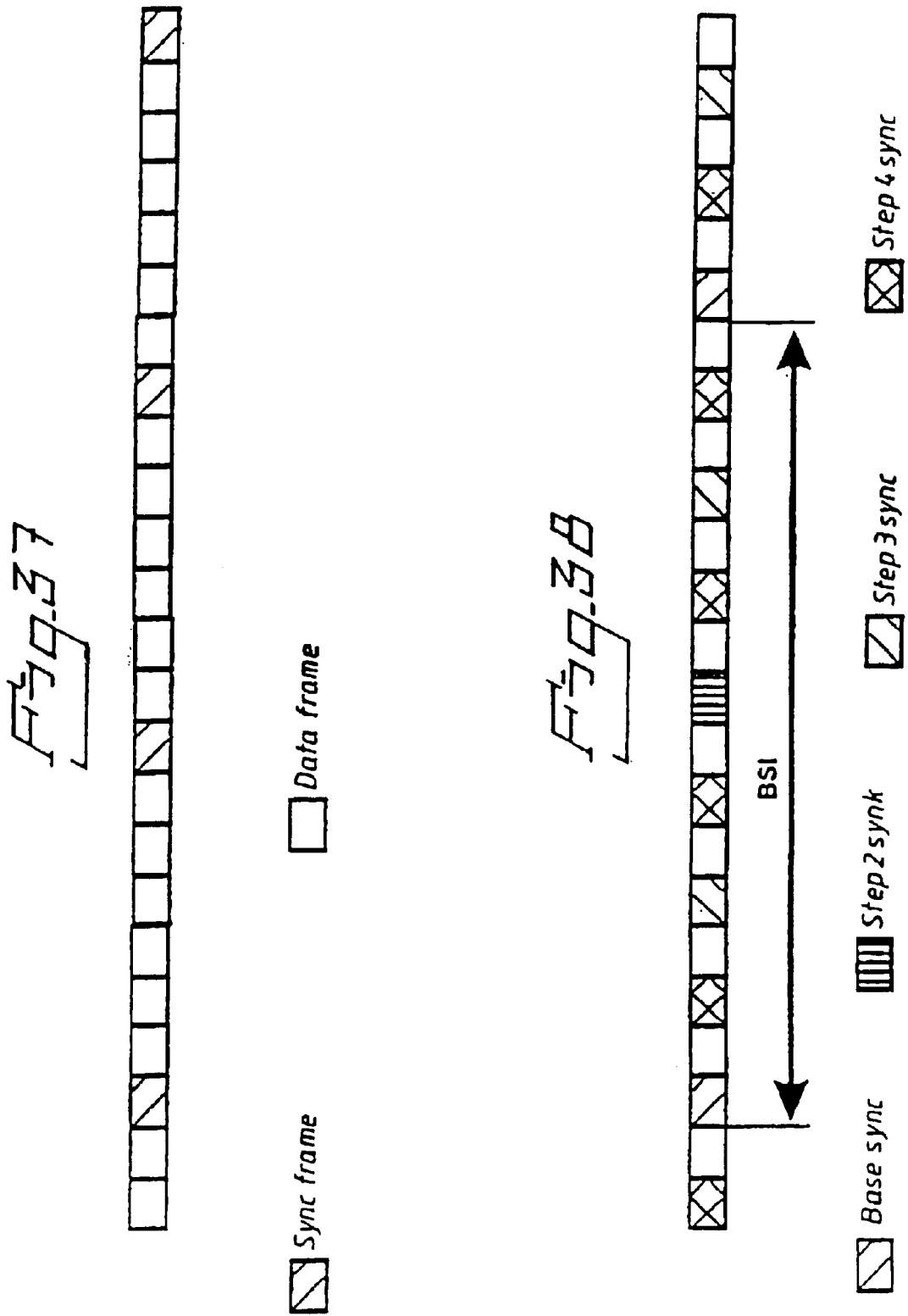

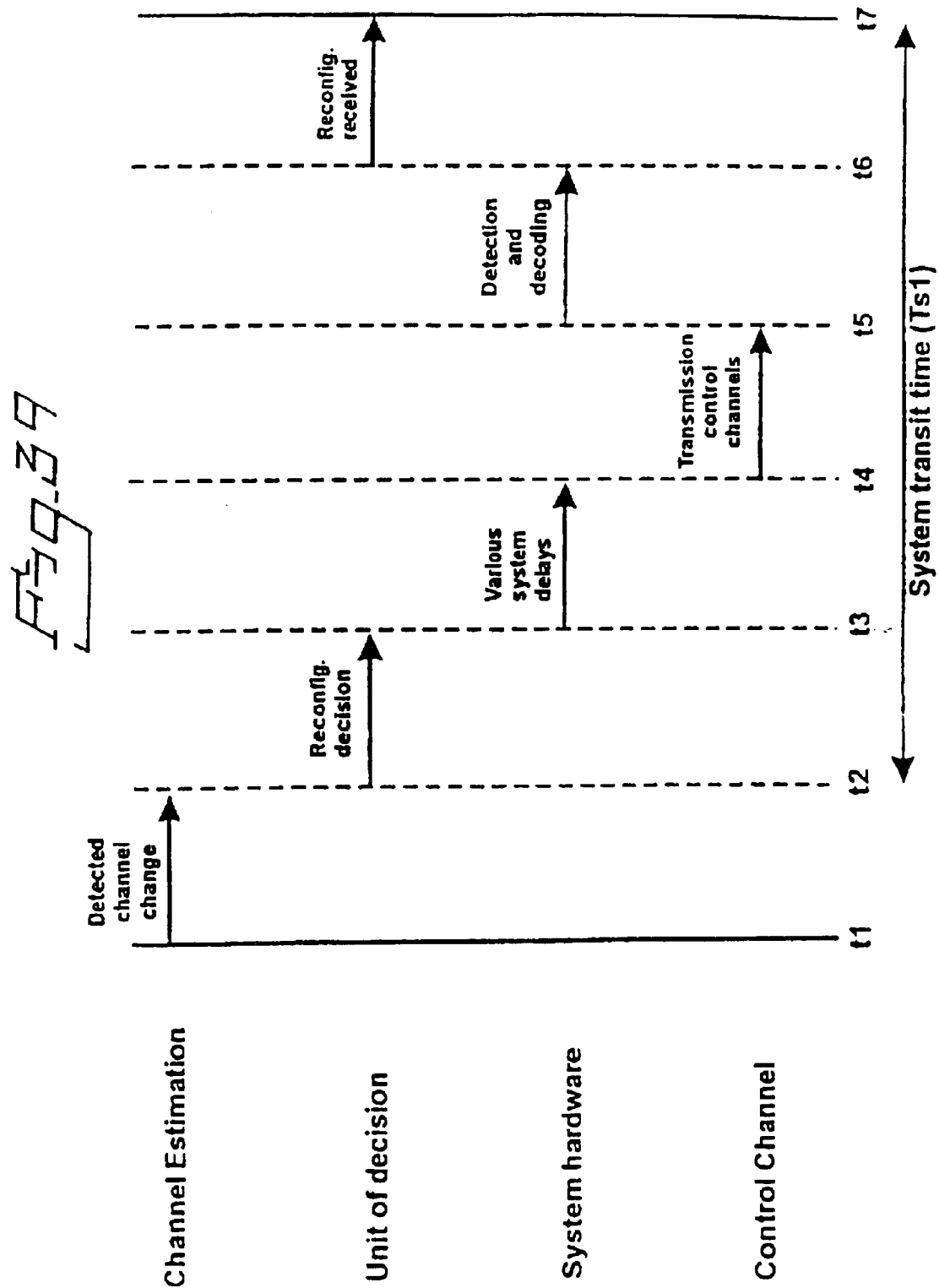

MULTI-CARRIER TRANSMISSION SYSTEMS

BACKGROUND OF THE INVENTION

1. Field of the Invention

The present invention relates to multi-carrier transmission systems, particularly to multi-carrier transmission systems having the facility to dynamically change carrier bit-loading and a method of synchronising the updating of parameters relating to bit-loading.

2. Discussion of the Background

The demand for provision of multi-media and other bandwidth services over telecommunications networks has created a need to transmit high bit rate traffic over copper pairs. This requirement has led to the development of a number of different transmission schemes, such as, ADSL and VDSL. One of the more likely modulation systems for all these transmission schemes is a line code known as DMT (discrete multi-tone), which bears some resemblance to orthogonal frequency division multiplex, and is a spread spectrum transmission technique.

In discrete multi-tone transmission, the available bandwidth is divided into a plurality of sub-channels each with a small bandwidth, 4 kHz perhaps. Traffic is allocated to the different sub-channels in dependence on noise power and transmission loss in each sub-channel. Each channel carries multi-level pulses capable of representing up to 11 data bits. Poor quality channels carry fewer bits, or may be completely shut down.

Because inter pair interference in copper pair cables is higher where data is transmitted in both directions, i.e. symmetric duplex, a number of transmission schemes have proposed the use of asymmetric schemes in which high data rates are transmitted in one direction only. Such schemes meet many of the demands for high bandwidth services, such as, video-on-demand but, in the long term, symmetric duplex systems will be required.

VDSL technology resembles ADSL to a large degree, although ADSL must cater for much larger dynamic ranges and is considerably more complex as a result. VDSL is lower in cost and lower in power, and premises VDSL units need to implement a physical layer media access control for multiplexing upstream data.

Four line codes have been proposed for VDSL:

CAP; Carrierless AM/PM, a version of suppressed carrier QAM, for passive NT configurations, CAP would use QPSK upstream and a type of TDMA for multiplexing (although CAP does not preclude an FDM approach to upstream multiplexing);

DMT; Discrete Multi-Tone, a multi-carrier system using Discrete Fourier Transforms to create and demodulate individual carriers, for passive NT configurations; DMT would use FDM for upstream multiplexing (although DMT does not preclude a TDMA multiplexing strategy);

DWMT; Discrete Wavelet Multi-Tone, a multi-carrier system using Wavelet Transforms to create and demodulate individual carriers, DWMT also uses FDM for upstream multiplexing, but also allows TDMA; and SLC; Simple Line Code, a version of four-level baseband signalling that filters the base band and restores it at the receiver, for passive NT configurations; SLC would most likely use TDMA for upstream multiplexing, although FDM is possible.

Early versions of VDSL will use frequency division multiplexing to separate downstream from upstream channels and both of them from POTS and ISDN. Echo cancellation may be required for later generation systems featuring symmetric data rates. A rather substantial distance, in frequency, will be maintained between the lowest data channel and POTS to enable very simple and cost effective POTS splitters. Normal practice would locate the downstream channel above the upstream channel. However, the DAVIC specification reverses this order to enable premises distribution of VDSL signals over coaxial cable systems.

In a multi-carrier system there is always a need to exchange control information between a transmitter and a receiver. This information is generated in the receiver and terminated in the transmitter. This information contains data on the instantaneous characteristics of the channel and information about system change decisions needed to handle the changes in channel characteristics.

In systems that use bit-loading techniques, the number of transmitted bits per symbol is adapted, or regulated, to the signal-to-noise ratio (SNR) of the current carrier wave. This regulation dynamically affects, in time, the total bandwidth of the system. This variation in bandwidth leads to an absolute system requirement for synchronous configuration of the transmitter and the receiver, in terms of the number of coded/decoded bits per symbol and carrier wave. If this requirement is not met, the system will be unable to maintain a connection.

SUMMARY OF THE INVENTION

The present invention achieves this requirement, in a multi-carrier modulated system with bit-loading capacity, by dynamically changing the number of coded/decoded bits per carrier wave. The receiver continuously measures and estimates the characteristics and changes of/in the channel. From this information, performance for each sub-channel (sub-wave) is identified. Then, on the basis of this information, reconfigurations of the transmitted number of bits per symbol for each single carrier wave are decided. To transmit this information, from a transmitter to a receiver, a special control channel is established. The control channel is primarily used for the exchange of channel information and bit allocation changes for carrier waves. It is of the outmost importance that this reallocation of bits per carrier wave is effected synchronously in order to maintain a connection. The present invention relates to a method that, by means of a particular algorithm, ensures the synchronism of the system during configuration changes.

It is an object of the present invention to provide a method, for use in a multi-carrier transmission system, of maintaining synchronism between two transceivers during dynamic system reconfiguration of bit-loading factors.

It is a further object of the present invention to provide a multi-carrier transmission system, in which synchronism between two transceivers is maintained during dynamic system reconfiguration of bit-loading factors.

It is a yet further object of the present invention to provide a transceiver for use with a multi-carrier transmission system, in which synchronism between two transceivers is maintained during dynamic system reconfiguration of bit-loading factors.

It is another object of the present invention to provide a receiver for use with a multi-carrier transmission system, in which synchronism between two transceivers is maintained during dynamic system reconfiguration of bit-loading factors.

It is yet another object of the present invention to provide a transmitter for use with a multi-carrier transmission system, in which synchronism between two transceivers is maintained during dynamic system reconfiguration of bit-loading factors.

According to a first aspect of the present invention, there is provided a multi-carrier transmission system having a first and a second transceiver, each of said transceivers having a receiver and a transmitter, wherein data is transmitted between said transceivers by modulating said data onto a multiplicity of carrier waves in the form of multi-bit symbols, wherein each of said carrier waves constitutes a channel, and wherein the number of bits per symbol, (the bit loading), varies between channels and, within a channel, with time, so that each channel has associated therewith a bit loading parameter, characterised in that, in operation, said multi-carrier system is adapted to synchronously update, at said first and second transceivers, the bit loading parameters associated with each channel by transmission of data over a control channel, in that said control channel is established, at system start-up, on a predetermined one of said multiplicity of carrier waves whose identity is known to said first and second transceivers, and in that said control channel is, after start-up, changed from said predetermined channel to a further channel, selected by said first transceiver on the basis of channel characteristics.

Decisions relating to changes in bit loading and control channel selection may be initiated by said first transceiver transmitting command signals over said control channel, said second transceiver may effect changes in bit loading and control channel carrier wave selection, and said second transceiver may measure changes in channel characteristics and forwards data relating thereto over said control channel to said first transceiver.

Said multi-carrier transmission system may be a DMT transmission system.

Said multi-carrier transmission system may be a DMT based VDSL system.

Said multi-carrier transmission system may be a DMT based ADSL system.

Said predetermined carrier wave may be selected from said multiplicity of carrier waves on the basis of channel SNR characteristics so that said control channel is subject to minimal interference from noise.

On activation of said multi-carrier system, said control channel may be established by means of a process comprising the following three steps:

establishment of said control channel on a predetermined carrier wave;

transfer of said control channel to a carrier wave selected by said multi-carrier system and enabling bit loading control; and enabling of all carrier waves.

Said step of establishing said control channel may include, in each of said first and second transceivers:

booting said transmitter;

said transmitter continuously transmitting frames in which all carrier waves other than said predetermined wave are modulated with random data;

said transmitter transmitting a system heartbeat;

booting said receiver;

said receiver initiating channel equalization;

synchronizing clocks in said first and second transceivers; and establishing said control channel on said predetermined carrier wave on receipt of a heartbeat.

Said step of transferring said control channel may include, in said first transceiver:

reception of data, by the transmitter, relating to measured channel characteristics from receivers in both said first and second transceivers;

selection of a carrier wave to which said control channel is to be reallocated by said transmitter;

transmission, by said transmitter, of a signal identifying said carrier wave, to which said control channel is to be reallocated, to said second transceiver;

on receipt of a confirmation signal, from said second transceiver, said transmitter terminating said control channel on said predetermined carrier wave;

said transmitter starting said control channel on the reallocated carrier wave at a heartbeat;

said receiver measuring channel characteristics and transmitting data relating thereto to said transmitter in said first transceiver;

said receiver equalizing said measured channel;

said receiver obtaining a channel estimation from the second transceiver and transmitting data relating thereto to said transmitter in said first transceiver;

said receiver receiving data identifying the carrier wave for reallocation of said control channel;

said receiver receiving a confirmation signal from said second transceiver;

said receiver terminating the control channel on said predetermined carrier wave;

said receiver establishing the control channel on the reallocated carrier wave; and if said control channel cannot be established, returning to said step of establishing said control channel.

Said step of enabling all carrier waves may include, on a continuous basis, in said first transceiver:

said transmitter obtaining data relating to measured channels from receivers in both said transceivers;

said transmitter determining the bit loading parameter for each carrier wave;

said transmitter transmitting data relating to the bit loading parameter to said second transceiver;

said transmitter changing the bit loading parameter on confirmation from said second transceiver;

the receiver measuring the channel characteristics of said multiplicity of channels and sending data relating to said measurements to said transmitter;

the receiver equalizing said multiplicity of channels in accordance with said measured channel characteristics;

the receiver obtaining a channel estimation from said second transceiver for each of said multiplicity of channels;

the receiver obtaining a new bit loading parameter for each of said multiplicity of channels;

the receiver obtaining a confirmation signal from said second transceiver;

the receiver updating the bit loading parameters for each of the multiplicity of channels.

Channel characteristics may be estimated by periodic transmission, by one of said transceivers, of a base sync frame having a predetermined content and comparing, in the other of said transceivers, the received sync frame with a reference frame.

Said channel characteristics may include attenuation, phase shifting and variance.

Said base sync frames may be transmitted at intervals, the BSI, and said BSI being locked into said transceivers thereby enabling said transceivers to identify a frame as a sync frame.

Additional sync frames may be transmitted at intervals between said base sync frames.

Said first transceiver may issue commands for system reconfiguration at the start of a BSI and system reconfiguration may be effected at the start of the next. BSI.

Said BSI may be greater than twice the system transit time for signals.

According to a second aspect of the present invention, there is provided in a multi-carrier transmission system having a first and a second transceiver, each of said transceivers having a receiver and a transmitter, wherein data is transmitted between said transceivers by modulating said data onto a multiplicity of carrier waves in the form of multi-bit symbols, wherein each of said carrier waves constitutes a channel, and wherein the number of bits per symbol, (the bit loading), varies between channels and, within a channel, with time, so that each channel has associated therewith a bit loading parameter, a method of operating a control channel characterised by:

synchronously updating, at said first and second transceivers, the bit loading parameters associated with each channel by transmission of data over the control channel;

establishing said control channel, at system start-up, on a predetermined one of said multiplicity of carrier waves whose identity is known to said first and second transceivers; and after start-up, changing said control channel from said predetermined channel to a further channel, selected by said first transceiver on the basis of channel characteristics.

Said method may include the steps of:

initiating decisions, relating to changes in bit loading and control channel selection, in said first transceiver and transmitting command signals over said control channel;

said second transceiver effecting changes in bit loading and control channel carrier wave selection; and said second transceiver measuring changes in channel characteristics and forwarding data relating thereto over said control channel to said first transceiver.

Said multi-carrier transmission system may be a DMT transmission system.

Said multi-carrier transmission system may be a DMT based VDSL system.

Said multi-carrier transmission system may be a DMT based ADSL system.

Said predetermined carrier wave may be selected from said multiplicity of carrier waves on the basis of channel SNR characteristics so that said control channel is subject to minimal interference from noise.

Said control channel may be established, on activation of said multi-carrier system, by means of a process comprising the following three steps:

establishment of said control channel on a predetermined carrier wave;

transfer of said control channel to a carrier wave selected by said multi-carrier system and enabling bit loading control; and enabling of all carrier waves.

Said step of establishing said control channel may include, in each of said first and second transceivers:

booting said transmitter;

said transmitter continuously transmitting frames in which all carrier waves other than said predetermined wave are modulated with random data;

said transmitter transmitting a system heartbeat;

booting said receiver;

said receiver initiating channel equalization;

synchronizing clocks in said first and second transceivers; and establishing said control channel on said predetermined carrier wave on receipt of a heartbeat.

Said step of transferring said control channel may include, in said first transceiver:

reception of data, by the transmitter, relating to measured channel characteristics from receivers in both said first and second transceivers;

selection of a carrier wave to which said control channel is to be reallocated by said transmitter; transmission, by said transmitter, of a signal identifying said carrier wave, to which said control channel is to be reallocated, to said second transceiver;

on receipt of a confirmation signal, from said second transceiver, said transmitter terminating said control channel on said predetermined carrier wave;

said transmitter starting said control channel on the reallocated carrier wave at a heartbeat;

said receiver measuring channel characteristics and transmitting data relating thereto to said transmitter in said first transceiver;

said receiver equalizing said measured channel;

said receiver obtaining a channel estimation from the second transceiver and transmitting data relating thereto to said transmitter in said first transceiver;

said receiver receiving data identifying the carrier wave for reallocation of said control channel;

said receiver receiving a confirmation signal from said second transceiver;

said receiver terminating the control channel on said predetermined carrier wave;

said receiver establishing the control channel on the reallocated carrier wave; and if said control channel cannot be established, returning to said step of establishing said control channel.

Said step of enabling all carrier waves may include, on a continuous basis, in said first transceiver:

said transmitter obtaining data relating to measured-channels from receivers in both said transceivers;

said transmitter determining the bit loading parameter for each carrier wave;

said transmitter transmitting data relating to the bit loading parameter to said second transceiver;

said transmitter changing the bit loading parameter on confirmation from said second transceiver;

the receiver measuring the channel characteristics of said multiplicity of channels and sending data relating to said measurements to said transmitter;

the receiver equalizing said multiplicity of channels in accordance with said measured channel characteristics;

the receiver obtaining a channel estimation from said second transceiver for each of said multiplicity of channels;

the receiver obtaining a new bit loading parameter for each of said multiplicity of channels;

the receiver obtaining a confirmation signal from said second transceiver;

the receiver updating the bit loading parameters for each of the multiplicity of channels.

Channel characteristics may be estimated by periodic transmission, by one of said transceivers, of a base sync frame having a predetermined content and comparing, in the other of said transceivers, the received sync frame with a reference frame.

Said channel characteristics may include attenuation, phase shifting and variance.

Said base sync frames may be transmitted at intervals, the BSI, and said BSI being locked into said transceivers thereby enabling said transceivers to identify a frame as a sync frame.

Additional sync frames may be transmitted at intervals between said base sync frames.

Said first transceiver may issue commands for system reconfiguration at the start of a BSI and system reconfiguration is effected at the start of the next BSI.

Said BSI may be greater than twice the system transit time for signals.

According to a third aspect of the present invention, there is provided a receiver, characterised in that it is adapted for use with a multi-carrier transmission system as set forth above, or adapted to implement the method set forth above.

According to a fourth aspect of the present invention, there is provided a transmitter, characterised in that it is adapted for use with a multi-carrier transmission system as set forth above, or adapted to implement the method set forth above.

According to a fifth aspect of the present invention, there is provided a transceiver, characterised in that it includes a receiver as set forth above and a transmitter as set forth above.

BRIEF DESCRIPTION OF THE DRAWINGS

Embodiments of the invention will now be described, by way of example, with reference to the accompanying drawings, in which:

FIG. 1 illustrates, in schematic form, an asymmetric communications system.

FIG. 2 illustrates, in schematic form, a DMT system.

FIG. 3 illustrates, graphically, the channel separations used in an asymmetric DMT transmission system.

FIG. 4 illustrates, in schematic form, the basic blocks of a multi-tone carrier system modem to which the present invention relates.

FIG. 5 illustrates, in schematic form, a partitioning of the multi-tone carrier system modem, shown in FIG. 4, used to facilitate implementation.

FIG. 6 illustrates, in graphical form, copper pair spectrum allocation.

FIG. 7 illustrates, in schematic form, the frame structure used in the multi-tone carrier system described herein.

FIG. 11 illustrates, in schematic form, the frame correlation principle used in the multi-tone carrier system modem, shown in FIG. 4.

FIG. 12 illustrates, in schematic form, implementation of a correlator for use with the multi-tone carrier system modem, shown in FIG. 4.

FIG. 13 illustrates, in schematic form, the averager used in the correlator of FIG. 12.

FIG. 37 illustrates a synchronization frame.

FIG. 38 shows the arrangement, in time, of additional sync frames.

FIG. 39 shows the signal flow.

DETAILED DESCRIPTION OF THE PREFERRED EMBODIMENTS

Figure 8:
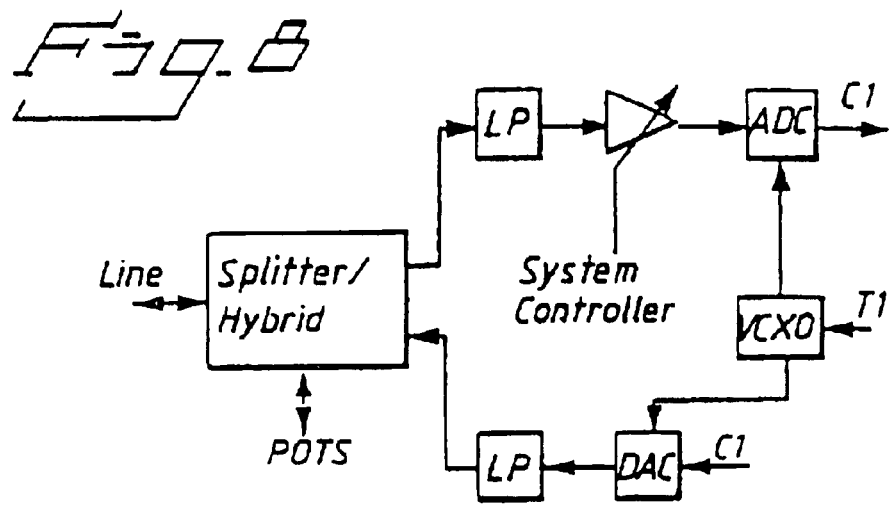
FIG. 8 illustrates, in schematic form, the analog interface for the multi-tone carrier system modem, shown in FIG. 4.

To facilitate an understanding of the present invention, a glossary of the abbreviations used in this patent specification are set out below:

ADC: Analog-to-Digital Converter
AIS: Alarm In Signal
ASIC: Application Specific Integrated Circuit
BPSK: Binary Phase Shift Keying
BSI: Base sync interval
BSI-D: BSI for down-link connection
BSI-U: BSI for uplink connection
CCH: Control channel
CM1: Carrier mode 1, bit-loaded and used carrier
CM2: Carrier mode 2, masked out, or disabled, carrier
CM3: Carrier mode 3, zero bit-loading enabled carrier
CP: Cyclic Prefix
DAC: Digital-to-Analog Converter
DAS: DF3 frame sequence
DF1: Data frame, random data parallel CCH
DF2: Data frame, random data one CCH
DF3: Data frame, fully bit loaded one CCH
DMT: Discrete Multi Tone
DWMT: Discrete Wavelet Multi-Tone
EMC: Electro Magnetic Compatibility
FEC: Forward Error Correction
FEXT: Far End Cross Talk
FFT: Fast Fourier Transform
FTTN: Fibre To The Node
G1 MUSIC: generation one, prototype system (vme based)
G2 MUSIC: three+two ASIC implementation
G3 MUSIC: two chip silicon implementation
IFFT: Inverse Fast Fourier Transform
IIR: Infinite Impulse Response
ISDN: International Standard for Digital Networks
ISI: Inter-Symbol Interference
JTAG: Joint Test Action Group
LEX: Local Exchange
LP: Lowpass
NT: Network Termination
NU: Network Unit
OFDM: Orthogonal Frequency Division Multiplexing
ONU: Optical Network Unit
PGA: Programmable Gain Attenuator
POTS: Plain Old Telephony Service
QAM: Quadrature Amplitude Modulation
SC: System Controller
SDH: Synchronous Digital Hierarchy
SF: Sync frame
SNR: Signal-to-Noise Ratio
STB: Set Top Box
SUS: Sync frame sequence
SUS1: SF and DF1 frame sequence
SUS2: SF and DF2 frame sequence
TA: Time Advance
TDMA: Time Division Multiple Access
UTP: Unshielded Twisted Pair
VCXO: Voltage Controlled Crystal Oscillator
VDSL: Very high bit-rate Digital Subscriber Lines The system, to which the present invention relates, is for convenience referred to as MUSIC—MUlti-carrier System for the Installed Copper network. MUSIC is intended to provide high-speed communication on telephone copper wire pairs for supporting broadband multimedia services.

The MUSIC system, described in this, and the cross referenced patent specifications . . . offers a cost-effective robust customer implementation in silicon, providing 26:2 or 13:2 Mbps asymmetric transmission over copper cables (<1300 metres) for use on existing local telephony networks.

The MUSIC system can be accessed using the network concept known as Fibre To The Node (FITN), using optical fibres, each serving many users, up to a cabinet near the users' homes. Thus, the cable length specification for MUSIC can be successfully limited to 1300 metres.

The MUSIC system is primarily intended for the transmission of a high (26 Mbps) bit-rate signal downstream to the subscriber and a low (2 Mbps) bit-rate signal upstream, from the subscriber.

FIG. 1 illustrates the MUSIC system. A network unit, NU, is connected to the fixed network by an optical fibre link, (FITN). A network termination, NT, connected to a multimedia application, e.g. video on demand, is linked to the NU via copper cable. The MUSIC system supports a high down stream data rate and a much lower up stream data rate.

In the MUSIC system, described herein, two fixed bit rates (13:2, 26:2 Mbps) are supported, the lower bit rate, 13:2 Mbps, can be implemented as an extra option for use with poor, or extremely long, copper cables.

For the network termination (NT), the connection consists of a set of standard interfaces, such as, POTS, ISDN, ATM25 and Ethernet. All transfer protocols are carried by the modem data stream, except for the POTS service, which is passively filtered out so that it is independent of modem status. The network unit (NU) terminates in the fixed network.

MUSIC separates the up and down-link spectra by passive filtering in the analog parts.

The version of MUSIC, described herein, is intended to allow for future functionality upgrades. For this reason, the FFT/IFFT block is designed to support full functionality so that it can be reused in future upgrades of the system.

The MUSIC system is a DMT-based, multi-carrier, VDSL system, using Discrete Fourier Transforms to create and demodulate individual carriers. This is illustrated in FIG. 2, which shows two transceivers each of which has a receiver, Rx, and a transmitter, Tx, connected to a twisted copper pair. Data is transmitted between the two transceivers using a plurality of carriers, some of which may not be used, e.g. where channel quality is extremely poor. The number of bits conveyed by each carrier may also vary, depending on channel quality.

A multi-carrier modulation technique, such as DMT, handles frequency dependent loss and noise in twisted pair-cables in an efficient manner. In the MUSIC system, the available 10 MHz bandwidth is divided into 1024 carriers each of which is 9.77 kHz wide. The allocated transmission power for the individual carriers depends on the noise power and the transmission loss in each band. Every carrier carries multilevel pulses that can represent up to 12 bits of data (4096 QAM). The individual carrier's signal-to-noise ratio (SNR) is calculated on the receiver side. If a carrier has a high SNR, up to 12 bits are placed on that carrier. For carriers with low SNR values, fewer bits are placed on the carrier. Carriers affected by narrowband interferers are turned off. Forward error correction and data interleaving is used to mitigate the effects of occasional bursts of impulse noise.

Asymmetric VDSL is implemented in this version of the MUSIC system, which means that the downstream rate is much higher than the upstream rate. Two fixed downstream rates (26/13 Mbps) are supported by the system, the chosen rate depends on the actual cable length (<1300 meters) and/or the quality of the channel. The upstream rate is fixed at 2 Mbps. Different frequency bands can be used in the MUSIC system to separate the downstream channel from upstream channel and both from POTS, see FIG. 3.

Alternatively, other duplex methods can be used, e.g. TDMA and/or a method where every other carrier is dedicated for the downstream and upstream channel.

FIG. 4 shows an overview of a MUSIC modem to which the present invention relates. The main hardware blocks are ADC and DAC, synchronization, fourier transform processing, channel estimation/equalizer, symbol mapping and detection, coding and decoding with interleaving, network interface and system controller.

The modem can be considered in terms of four principle functional blocks, namely:
the digital receiver unit;
the digital transmitter unit;
the analog front end; and
the system controller/PCI.

The analog front end includes a hybrid transformer connected to an unshielded twisted pair and POTS. On the receiver side, the hybrid is connected, via a low pass filter, LP, a programmable gain attenuator, PGA, to an analogue to digital convertor. A voltage controlled crystal oscillator, VCXO, is used to drive the analogue to digital convertor. On the transmitter side the hybrid is connected to a digital to analogue convertor via a low pass filter.

The digital receiver unit includes a fast fourier transform and rescaling unit, FFT, connected, as shown in FIG. 4, to a synchronisation unit and a channel estimator. The channel estimator is connected, via a symbol detection unit and a de-interleaving an decoding unit, to a bit manipulation unit and thence to a network application interface.

The digital transmitter unit includes a bit manipulating unit connected to an inverse fast fourier transform and scaling unit, IFFT, via an encoding and interleaving unit and a symbol mapping unit.

The system control is connected to various functional units in the digital receiver and digital transmitter and to the network application interface and a computer interface, as shown in FIG. 4.

The network interface connects the higher protocol level to the modem layer one functionality. This block is responsible for providing the system with data at the configured bit rate, adding dummy frames if needed.

The data is then channel coded and interleaved. The MUSIC system, herein described, uses a convolutional code combined with interleaving. Using a depth of multiple frames, a combined frequency/time interleaving is obtained (see later in this specification).

The symbol mapping block receives the input data as an integer vector. This vector is mapped into the configured constellation depending on the current bit loading value. The mapper uses a Gray-coding scheme to reduce the probability of bit errors.

A real vector multiplication is the first step in the IFFT block. This enables the system to scale the output power level of each carrier. The IFFT block then performs a real 2048 points inverse FFT on the input data, modulating each carrier. As a final step, an address wrap around is performed on the output data, adding a copy of the first 128 samples at the end of the frame. This is called the cyclic prefix (CP).

The modulated signal passes to a DAC which converts the signal with a minimum true dynamic range of 84 dB. The DAC is clocked by the system sample clock at 20 MHz. To remove Nyquist ghosts the signal is LP filtered. The hybrid provides a balanced interface to the copper cable.

An overview of the MUSIC transmitter and receiver signal path is shown in FIG. 4. The transmitter part uses the same hybrid construction as the receiver.

At the receiver end, the splitter/hybrid transceiver separates the frequencies used by POTS, from 0 to 4 kHz, from the frequencies used by the system. It also extracts the low level receive signal from the combined high level transmit signal and the low level receive signal.

To reduce Nyquist effects on the signal the analog received signal is low-pass filtered before it is fed into the PGA (Programmable Gain Amplifier).

The PGA is necessary to make best use of the dynamic range of the ADC. In this system, the dynamic range should be at least 66 dB.

After the signal has been converted to digital format, the synchronization and the FFT block receives the data.

In the synchronization block, a frame clock (for the control of the FFT buffers) and a control signal for the VCXO is generated. Initially, the synchronization block retrieves the frame clock from the sampled signal. The frame clock is then used for calculating the frame timing estimate and is transferred to the VCXO feed back controller. The VCXO generates the sampling clock (20 MHz).

A sampling clock, controlled only by the frame time estimate, is not sufficiently accurate in a DMT system. Therefore, after the locking sequence, a dedicated pilot carrier is used to achieve a high sampling clock timing accuracy.

A BSI-signal is also extracted from the pilot carrier. BSI is the Base Synchronization Interval timing signal used to synchronize the transmitter and receiver CCH communication. One of the novel aspects of the MUSIC system is the algorithm used by the synchronization block, which is discussed in greater detail later in this specification.

A 2048 point real FFT is performed on the input frames in the FFT block. After this, rescaling is performed, based on the energy loading parameters, before the data is transferred to the next block.

The channel estimation and equalization are performed on the data output from the FFT block. All data frames are used for estimating the channel properties. These are then used to compute a bit-loading vector, determining the number of bits transmitted on each carrier. This information is subsequently sent to the transmitter through the upstream control channel (CCH).

In the symbol detection block, a demapping is performed, for each carrier, according to the bit-loading mask.

After demapping, a deinterleaving and forward error correction (FEC) decoding is performed on the detected bit-stream.

The data is then ready for the Network/Application interface block after bit manipulation. The dummy frames are removed in this block.

At the heart of the system, shown in FIG. 4, is the system controller (SC). The SC is a general purpose processor which interfaces and controls the various sub-blocks, using a local PCI bus. In the version of MUSIC herein described, the controller CPU is programmable. An external port is provided, through an on-board JTAG interface, to facilitate programming.

The main tasks of the SC is to control the system start-up and run-time behaviour and to perform bit-loading and energy loading calculations. It will communicate with the remote side of the modem through a dedicated control channel (CCH). This channel carries data relating to bit/ energy loading changes and other system signalling.

To obtain a cost effective product for high volume use, the digital parts of the system must be based on at least two ASIC circuits. FIG. 5 shows how the system can be partitioned for the purposes of chip design. One chip contains the FFT/IFFT kernel. A second chip contains frame synchronization, channel estimation and equalization, symbol detection and symbol mapping. The analog block and the network interface block can be implemented on third and fourth chips respectively.

The system parameters used by the MUSIC system, herein described, are set out in Tables 1 to 3, appended hereto.

VDSL systems work in the spectrum from 0 to 40 MHz. In this band the MUSIC system, herein described, occupies the lower 10 MHz, see FIG. 6. A number of traditional bands exist in this spectrum, including POTS and some radio amateur bands. Different frequency bands are used in the MUSIC system, herein described, to separate the downstream from upstream channels. As the MUSIC system, herein described, uses 1024 carriers over 10 MHz, each carrier has a bandwidth of 9.77 kHz, the first two carriers are allocated by the DC level and the POTS service. The last carrier is disabled because it is the Nyquist point. Other carriers (in radio bands) my need to be cancelled. This is primarily a question of immunity and radiation for the balanced copper pair.

By passive filtering of the POTS spectrum, this service can be made independent of the MUSIC system, herein described, run-time status, or power supply.

There are two ways to provide the ISDN service for a MUSIC modem connection. One way is to allow POTS and ISDN systems to exist below the MUSIC frequency bands. This can be achieved using a similar filtering process for the ISDN band spectrum, as for the POTS. This filtering enables the service to be provided independently of configuration.

The other way of providing ISDN, is to let ISDN be a bearer service in the MUSIC system. This solution has the advantage in terms of spectral efficiency. Using 1024 carriers over 10 MHz gives each carrier a bandwidth of 9.77 kHz. The ISDN spectrum requires the allocation of (150-4)/9.77= 5, of these carriers. Because of the channel characteristics, these five carriers must be selected to have the best SNR in the system. For a standard connection this gives 5*100=500 kbps of bandwidth.

The optimum solution is, therefore, to use the modem as a bearer, allocating only 64 kbps, compared to 500 kbps for the total bandwidth for the 64 kbps ISDN service.

The results of the measurements of attenuation and FEXT ("Far End Cross Talk"), carried out on one telecommunication operator's network, showed that it is possible to achieve bit rates higher than 100 Mbps, if the cable is shorter than 200–300 meters. For longer cables, the attenuation on higher frequencies limits the maximum bit rate. For cables around 500 meters, 40 Mbps can be achieved, and for a 1 km cable, 15–20 Mbps is realistic.

Another factor that decreases the performance is EMC, which limits the power used. Some parts of the frequency domain may also have to be excluded.

A typical PSTN can be expected to have the following impulse noise characteristics:

maximum duration 250 $\mu s$ median interval 67 ms maximum peak amplitude 20 mV most of the energy below 200 kHz background noise −107 dBm/Hz The main source for timing in the system is the sample clock. The reference for the sample clock is situated on the NU side and is common to all twisted copper pairs within a secondary cable. The sample clock frequency is 20 MHz±10 ppm with a phase jitter of less than 0.5 ns.

The sample clock at the NT side is phase-locked to the NU side. The logic for the locking uses the frame timing estimation in a first stage and then uses the pilot carrier to produce a fine adjustment of the locking. The locking logic controls the frequency of a VCXO via an 18 bit digital to analogue convertor. The requirements for the VCXO are 20 MHz±25 ppm range and a 10 ppm/Volt sensitivity. The final locking should have an accuracy of $\frac{1}{100}$ of a sample, with a phase jitter of less than 0.5 ns.

The frame clock is 1/(2048+128) of the sample clock and controls the start of receiving and transmitting frames. The frame clock, used for both transmitting and receiving, differs in phase on both the NU and the NT side.

The frame clock for transmitting on the NT side is the master and controls the start of the signalling intervals, see FIG. 7.

The receive frame clock on the NT side is derived from the frame timing estimation hardware function and controls the start of frame sampling period, see FIG. 7.

The frame clock for transmitting on the NT side is the same as the frame clock for receiving, but is a TA sample "earlier" in phase. TA is a parameter measured during system start-up at the NU side and used for compensation of propagation delay on the copper wire. This has to be done in order to maintain the orthogonality, over the copper wire, for the sampled periods, on both the uplink and the downlink. The frame clock for transmitting on the NT side controls the start of the signalling intervals, see FIG. 7.

The receiving frame clock on the NU side is delayed a number of sample clock cycles (TA) relative to the frame clock for transmitting after the TA calculation is carried out. The delay before the calculation of TA in the start-up sequence is determined by the frame timing estimation hardware function and the value is accessible by the system controller. The receive frame clock on the NU side controls the start of frame sampling period, see FIG. 7.

The BSI clock is used to synchronize parameter changes between the transmitting and receiving side.

The parameters can, for instance, be bit loading, energy loading, or control channel frequency. The parameters are updated by the system controller, on both sides, before the BSI clock initiates the switch to the new set-up.

The BSI clock is 1/8192 of the frame clock. The BSI clock in the uplink is delayed by a half BSI clock cycle relative to the BSI clock in the downlink.

A short pseudo-random sequence on the pilot channel is used for BSI synchronization between the transmitting and receiving side.

The cyclic prefix is an extension of the frames added by the FFT chip. In order to maintain the orthogonality during the whole signalling period, the last 128 samples of the frame are copied and placed before the actual frame. This arrangement handles problems associated with intersymbol interference caused by time dispersion.

It is important that, the part of the signalling period sampled on the receiving side only, overlaps one signalling period in the other direction, along the entire copper wire. TA is used to optimize this overlap period. The maximum cable length is limited by TA=128 samples=6.4 $\mu s$ propagation delay. This corresponds to 1280 meter (if propagation delay is 5 ns/m).

The analog interface connects the received and transmitted digital data stream at the C1 chip with the telephone line. There are also connections to the T1 chip and the system controller for control purposes.

The analog interface is illustrated in FIG. 8. The line is connected to a hybrid transformer, which is also linked to the POTS. On the receive side of the hybrid, the incoming signal is passed via a low pass filter and programable gain attenuator to an analogue to digital convertor, ADC, and thence to the C1 chip. On the transmit side of the hybrid, the outgoing digital signal is converted to analogue for by, digital to analogue convertor, DAC and thence passed via low pass filter LP to the hybrid transformer. A voltage controlled crystal oscillator, which drives both ADC and DAC, is connected to the synchronization block of the T1 chip.

An OFDM-frame is a sum of sinusoidal carriers modulated in phase and amplitude and spaced in the frequency domain with a minimum distance of separation between carriers. The assumption that the symbols within the frame are equally distributed and uncorrelated with each other, yields a time domain signal with an approximately normally distributed instantaneous amplitude. Thus, a small possibility exists that input data can cooperatively interact to create pulses with very large peak levels. However, the maximum amplitude must be limited to a lower amplitude than this so that there exist a sufficient number of quantization levels, in the DAC, to handle average signals.

Even if the DAC has enough resolution to accommodate a high peak level in the transmitter, there are limitations on the receiver side (ADC). However, the implications on the receiver side may not be as severe as they seem.

Figure 9:
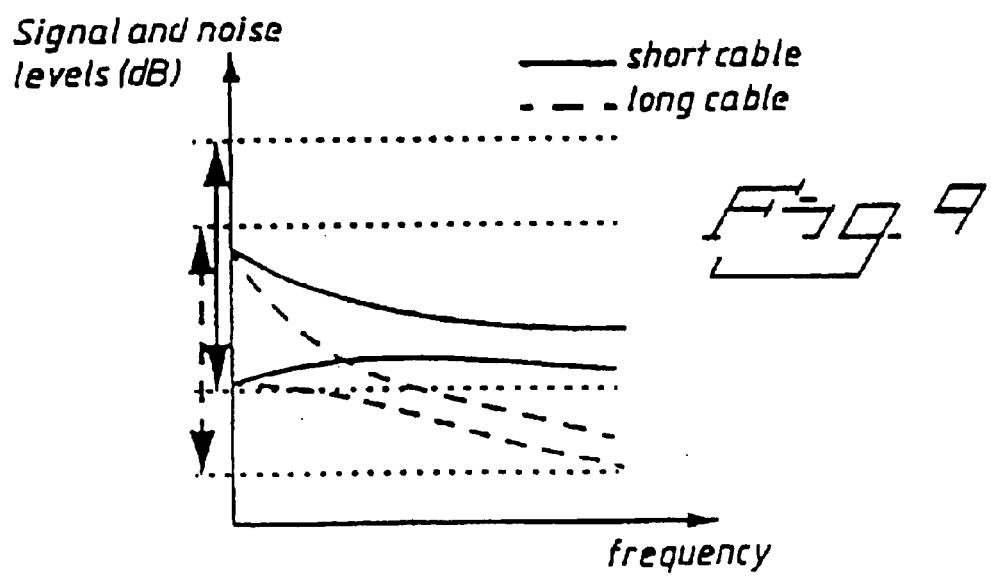
FIG. 9 illustrates, in graphical form, the dependence of signal-to-noise ratio on frequency for the multi-tone carrier system described herein.

A short cable has less attenuation in the high frequency range than a long cable, see FIG. 9. This means that an occasional pulse may appear in the receiver almost unmodified by the cable characteristics. Hence, a relatively large dynamic range is required in the receiver. However, this can be readily achieved since almost uniform attenuations do not require a large dynamic range. The ADC needs to accommodate the region indicated in FIG. 9 by the heavy solid arrowed line.

The larger high frequency attenuation of long cables does, however, require a large dynamic range. The high frequency attenuation also means that it would take several large peaks from the transmitter in order to build up high amplitudes in the receiver, a case which is even less likely to occur at the ADC input than single peaks. The headroom can, therefore, be decreased and the ADC should accommodate the region indicated by the heavy dashed arrowed line, in FIG. 9.

To summarize, the performance can be optimized by carefully setting the signal level at the receiver ADC in dependence on cable length.

The splitter/hybrid has two major tasks, namely to:

split and combine telephone signals (POTS) and VDSL signal frequency bands; and prevent the transmitted signal from appearing at the receiver on the same unit by balancing the cable.

Since each transmission direction has its own frequency band, it is possible to optimize both sides for their respective frequency bands to increase overall performance.

The purpose of the low-pass filter on the input signal is to reduce aliasing effects on interference above the used frequency range. The output low-pass filter reduces emitted power in the stopband. These filters may be part of the splitter/hybrid module.

The best commercially available ADC today is the Analog Devices AD9042 which has a signal-to-noise ratio of approximately 66 dB. It is recommended that either this ADC, or one with equal performance, is used.

For the purposes of this description it is assumed that a 14 bit resolution DAC is used.

Figure 10:
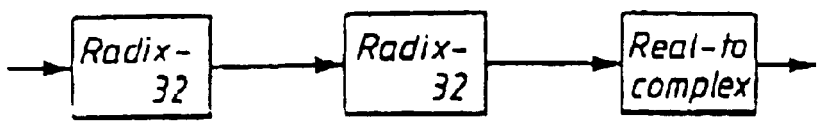
FIG. 10 illustrates, in schematic form, the FFT algorithm used in the multi-tone carrier system modem, shown in FIG. 4.

The FFT and IFFT algorithms are built from 1024-points complex FFTs with data reorganization to allow calculation of two real sequences at the same time. Hence, the FFT and IFFT are effectively 2048 points each. The hardware realization is based on a radix-32 kernel which calculates the result in three passes, see FIG. 10.

The relationship between signal-to-noise ratio and resolution in the algorithm can be expressed as:

$$SNR = 2^{2b-v-1}$$

with b=number of bits and v=11 (number of effective radix-2 passes). Solving for b yields 17 bits resolution (based on ADC SNR), but since the ADC is not the only source of analog signal degradation, 16 bits resolution in the algorithm should be adequate in order to maintain the resolution throughout the system.

The VCXO generates the sampling frequency used in the NT part of the system. The control voltage is based on data from the synchronization unit. The clock frequency has to be very stable and phase locked to the NU reference clock in order to preserve orthogonality between symbols.

In order to make full use of the ADC dynamic range, a programmable attenuator has to be inserted before the ADC. The attenuation level is mainly a function of the cable length and can be determined from the timing advance value by the system controller.

Attenuator resolution and range, and the relationship between the timing advance value and attenuation level, have to be determined. Equalization and variance values may also be used in the calculations for enhanced result.

In a DMT system a very accurate synchronization between the transmitter and the receiver is necessary, especially when carriers are modulated with large constellations. In the embodiment herein described, a new frame synchronization method that relies on correlation properties inherent in the received signal structure, is used.

On the NU side, a fixed frequency crystal oscillator is used as a reference for generating the sampling clock. On the NT side a sampling clock is generated by a VCXO (Voltage Controlled Crystal oscillator), which is phase-locked to the oscillator on the NU side. The VCXO is initially controlled by the frame timing estimate. The resolution of the frame timing estimate is, however, not sufficient in the present application. Therefore, after a lock-in sequence, a dedicated pilot carrier is used to achieve a very high sampling clock timing accuracy.

Due to the long symbol duration in a DMT system, intersymbol interference caused by the channel time dispersion, can be eliminated by using a guard interval as a prefix to every frame in the time domain. In order to maintain the orthogonality of the frames, the content of each prefix is a copy of the last part of the following frame, making the frames seem partially cyclic.

The synchronization method used for estimating the frame timing, employs the high correlation that exists between a prefix and the corresponding part of a frame. By continuously correlating samples of the received signal, separated in time by the (known) frame length, the passage of a guard interval will cause a peak in the correlation estimate. Therefore, these peaks will have a known timing relation to the frames and can be used to create a frame start signal. The principle is illustrated in FIG. 11.

The correlator and the peak time estimator use a system clock generated by a VCXO. This clock is divided by the total number of samples in a signalling interval, (a cyclic prefix and a frame), to create a signal with the same period as the correlation peaks. The phase difference, (frame time deviation), between these two signals is used as an input to a feed-back controller that adjusts the VCXO frequency to the correct sampling frequency. The phase of this sampling clock is, however, not accurate enough to be used in a DMT system. Therefore, the frame timing estimation is primarily used for a lock-in operation. It is also used for monitoring the frame timing to detect major deviations that will make a resynchronization necessary.

The correlation of the received data is calculated continuously. The time difference between the two signals is achieved by using a digital delay line of one frame length. The output of the delay line is multiplied by the non-delayed signal and integrated (accumulated) over an interval equal to the length of the cyclic prefix. The output of the integrator is the estimate of the correlation function.

Since only the timing information of the correlation estimate is used, a simplified estimator is implemented, using only the sign of the input data. This hardware implementation has a greatly reduced complexity compared to using the full sample word length.

Computer simulations have shown that using synchronous averaging of several signalling intervals reduces the variance of the frame timing estimate. Due to the reduced data word length used in the multiplier part of the correlator, it is feasible to implement such an averaging function immediately following the multiplier.

A block diagram showing the implementation of the correlator is shown in FIG. 12. The incoming signal X(k) is past through a delay with N=1024, i.e. one frame, and to a conjugator. The output from the delay and conjugator are then multiplied to produce a signal Y(k) which is passed to an averager. The output of the averager, Z(k) is past to a subtractor from which Z(k) delayed by L=128 is subtracted. This yields signal W(k) which is passed to an accumulator yielding an output signal C(k).

The details of the averaging part of the correlator are shown in FIG. 13. The averager comprises a series of delay elements combined with adders, as shown. The output signal can be expressed as:

$$Z(k) = \sum_{i=0}^{6} Y(k - iM)$$

where Y(k) is the input signal and Z(k) is the output signal.

In order to make, the averaging synchronous to the frame structure of the signal, the delays equal the signalling interval.

Figure 14:
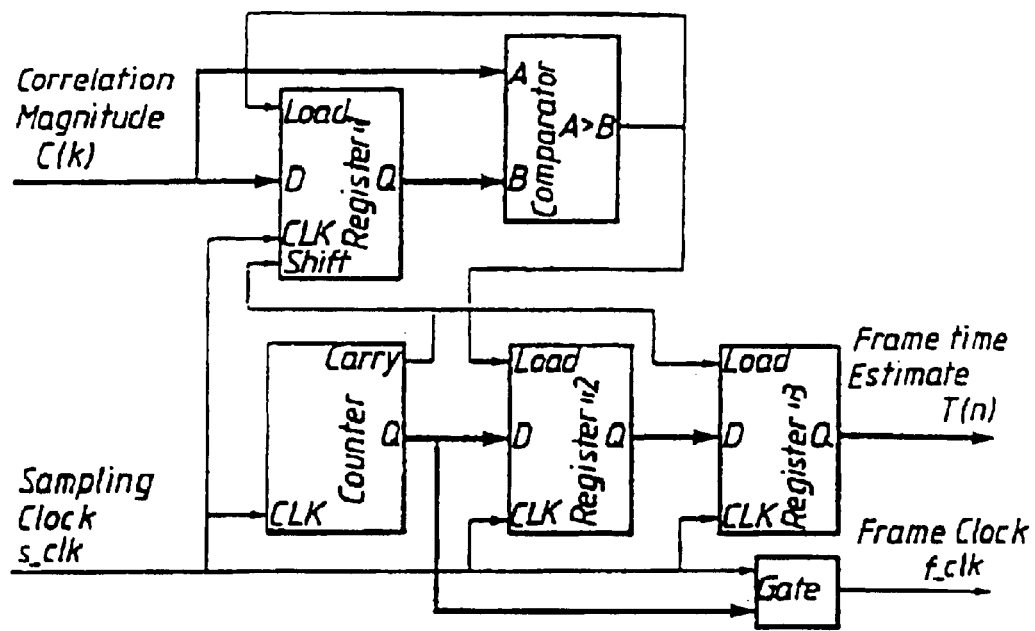
FIG. 14 illustrates, in schematic form, a correlation position detector for use with the multi-tone carrier system modem, shown in FIG. 4.

A detector for finding the position of the maximum magnitude of the correlation function estimate is shown in FIG. 14. It is implemented using a register (#1) for the most recent maximum value and a comparator. The register content and the correlation magnitude are compared, and every time a value larger than the register content is encountered, the new value is stored in the register. The present value of a counter, counting sampling intervals (modulo the signalling interval), is also put into a second register (#2). When a whole signalling interval has passed, this second register will contain an index to the maximum value found during that interval. This index is stored in a third register (#3), once per signalling interval, and the content of the first register (#1) is divided by two (using shift).

The index stored in register #3 is interpreted as the deviation between the counter value and the actual timing of the input signal frames. The feed-back controller will make the average of this deviation converge towards zero. The counter value can then be used as a pointer into the signalling interval. The frame timing clock is generated using this counter value to indicate the frame start.

The estimation of the pilot carrier frequency domain complex representation is performed using the FFT unit available in the system. The advantage of using this method is that the estimate will be independent of the varying modulation of the other carriers. This is due to the inherent orthogonality between the carriers. In order to achieve an estimate with acceptably low variance, some averaging is necessary. This is done using first-order digital IIR filters.

Unfortunately, the estimate is represented as a complex number in rectangular coordinates so the argument is not directly available. In the feed-back loop it is necessary to detect very small argument deviations. Therefore, the resolution of the argument must be high.

The feed-back controller will make the pilot carrier argument converge towards zero. An approximation of the argument, that is linear only in a small range around zero, is then sufficient to achieve acceptable performance. A useful approximation that is monotonic in almost all four quadrants and also easy to implement in digital logic is described by the expression:

$$A = M \cdot [\Im\{C\} - (1 sgn\ \Re\{C\}) \cdot K \cdot \Im\{C\} \cdot sgn \Im\{C\}]$$

where C is the complex pilot carrier estimate, M is a positive scaling constant and K is a positive constant that affects the shape of the function (K=2 is used here).

The channel introduces phase-shift on the pilot carrier that might cause misalignment between the input signal frame timing and the pilot argument zero. In order to eliminate this problem, the pilot carrier estimate is also passed through the frequency domain equalizer. The equalizer parameter for this carrier is set during the start-up sequence, when the frame timing estimate has converged to its final value.

The selection of pilot carrier will be fixed, but logic for selecting other carriers as pilot can also be provided.

The feed-back loop actually has two controllers, each with its own input signal. The two controller outputs are added and fed via a D/A-converter to the VCXO that generates the sampling clock. Both controllers are of the PI type (Proportional and Integrating).

Figure 15:
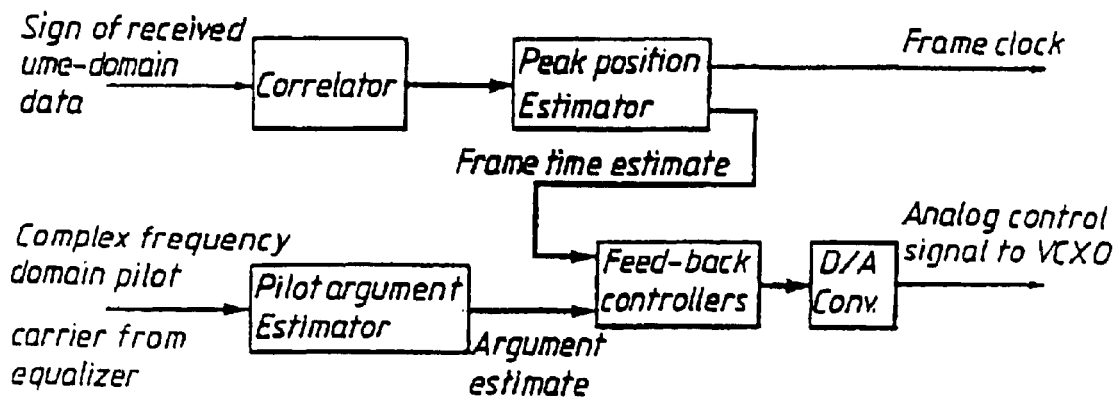
FIG. 15 illustrates, in schematic form, an overview of the synchronization unit employed in the multi-tone carrier system modem, shown in FIG. 4.

FIG. 15 gives an overview of the signal paths. The received time domain data passes through the correlator and peak position estimator to yield the frame clock. The complex frequency domain pilot carrier derived from the equalizer is passed to a pilot argument estimator, the output of which is past to feedback controllers which also receive an output from the peak estimator. The output from the feedback controllers is then passed to a digital to analogue convertor to yield a signal used to control the VCXO.

During the start-up sequence, only the frame timing controller is active. When the frame timing has stabilized, the equalization parameter for the pilot carrier is calculated and set (by the SC). This is done only once and further updating of this parameter is inhibited. After this change of equalization parameter, the averager for the argument estimate is given sufficient settling time. Finally, the frame timing controller is stopped and the pilot argument controller is activated. When the frame timing controller is stopped, its last output value is locked so the VCXO frequency remains close to its final value.

The pilot carrier is also used for the transmission of the Base Synchronization Interval (BSI) timing information. The carrier argument is normally supposed to be constant. A short pattern is BPSK-modulated onto the carrier, using phases 0 and π and leaving the carrier at phase 0 during the rest of the BSI interval. If this pattern is only a small fraction (<1%) of the BSI interval, the disturbance of the pilot carrier argument estimation is negligible. A correlator is used for detecting the pattern and give the timing signal for BSI.

The system controller (SC) must have read access, for synchronization lock detection and monitoring reasons, to registers holding the frame time deviation estimate and the pilot argument approximation.

In order to handle the initial equalization of the pilot carrier, it is necessary for the SC to read the averaged pilot carrier complex representation and write to the equalization parameter memory.

An offset register for determining the relative timing between the input data frames and the frame start signal is necessary and must be writable by the SC. This is used on the NT side.

The detected BSI event signals, for both receive and transmit, should be connected to the SC as interrupt inputs.

Alternatively, the pilot carrier can be recovered from the time-domain signal, using a bandpass filter, and directly used for phase-locking of a sampling clock oscillator. The frequency-domain method, described here, has the advantage that the pilot carrier estimate is independent of the modulation of the other carriers due to the orthogonality. A different frame synchronization method would be dependent on including a known pattern in some frames. This would reduce the system capacity.

The frame and cyclic prefix lengths are fixed in the embodiment herein described. The method, as described above, is designed to work in a feed-back loop with a VCXO. In a unit using a fixed sampling clock oscillator, the frame timing estimator design needs to be slightly modified. It is important that the VCXO has very low phase noise, since the feed-back loop is too slow to compensate such a disturbance.

A discrete multi-tone (DMT) system modulates N complex data symbols onto N carriers (here we use N=1024 carriers). This mapping is computed as an inverse discrete Fourier transform by using the Inverse Fast Fourier Transform (IFFT). In the receiver the N carriers are demodulated by a FFT.

Figure 16:
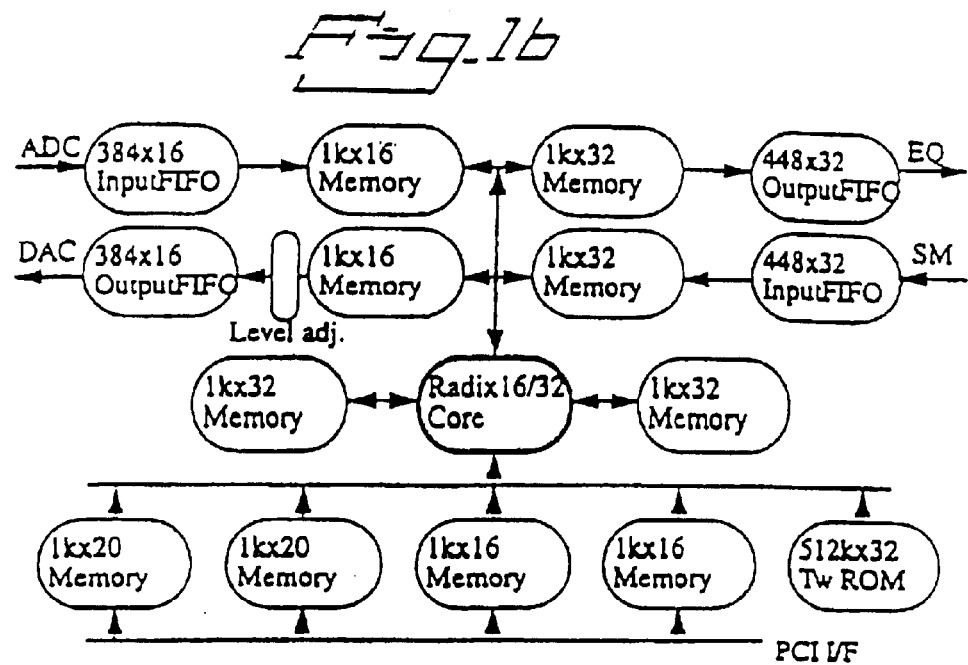
FIG. 16 illustrates, in schematic form, an overview of the FFT/IFFT unit employed in the multi-tone carrier system modem, shown in FIG. 4.

In the modem, herein described, the FFT and IFFT is carried out by the same unit, using the same radix 16, or 32 core, in different phases. This process is illustrated schematically in FIG. 16.

The main operation is divided into frames of length 2048 real, or 1024 complex values. For each frame this unit performs a FFT, IFFT, Scaling, Descaling, and addition of Cyclic Prefix.

The FFT and IFFT calculate 2048 point real FFTs and operate with a minimum of 16 bit arithmetic.

For the network terminal side, (NT), there is a requirement on synchronization between the input frame start and the IFFT output start. (A synchronization between the upstream and downstream carriers). The transmitter should be able to start sending a frame before it starts receiving a frame, so called timing advance.

A scaling should be provided before the IFFT. This scaling is a multiplication between the real coefficients stored in this unit and the input values from the symbol mapper (SM). The coefficients are 16 bits each.

The coefficient memory consists of two banks of equal size (16×1024 bit). One bank is in use while the other is updated. Switching is enabled through a PCI command and is executed at the next BSI.

After the FFT, a rescaling should be performed before transferring the data for equalization and symbol detection. This descaling is a multiplication by the inverse of the scaling values. The coefficients are represented by 16 bits.

An exponent (resulting in a post shift) of 4 bits might also be needed to maintain the precision.

The coefficient memory consists of two banks of equal size ((16+4)×1024 bit). One bank is in use while the other is updated. Switching is enabled through a PCI command and is executed at the next BSI.

Figure 17:
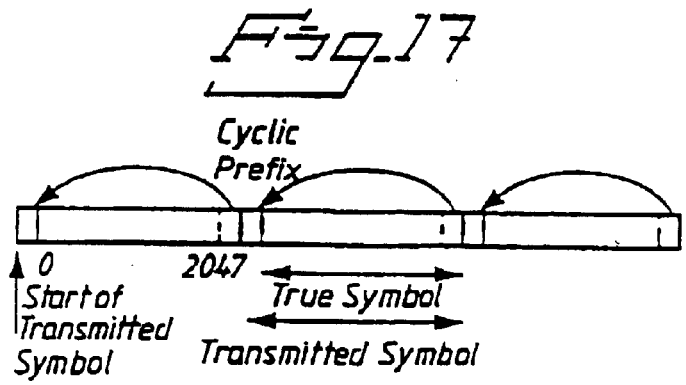
FIG. 17 illustrates, in schematic form, the use of a cyclic prefix.

At the beginning of each frame a cyclic prefix is added. This process is illustrated schematically in FIG. 17. The insertion of a cyclic prefix avoids inter-symbol interference (ISI) and preserves the orthogonality between the tones, resulting in a simple input-output relation which makes it possible to view each carrier as a separate channel. This cyclic prefix consists of a repetition of the last part of the frame.

Given that timing advance is used and the maximum cable length is 1300 m, a cyclic prefix of 128 samples will be needed. Thus, the output for each frame should be sample: 1920, 1921, . . . , 2046, 2047, 0, 1, 2, . . . , 2046, 2047.

For each of the above component, there is a FIFO to sib interface the external world with the FFT/IFFT input and output memories. Thus, in total there are 4 FIFOs.

It is recommended that the FIFOs interfacing the analog side have a size of 384 words (16 bits) and the FIFOs interfacing the T1 chip have a size of 448 words (32 bits).

Another DMT technique that does not use Fourier transforms is Discrete Wavelet Multi-tone Transform (DWMT). This method has been proposed to the ADSL standardization committee, which turned it down.

The precision needed in this technique depends on the required dynamic range, which in turn, is decided by the analog components (esp. DAC). The FIFO size will depend on clock speed differences and the amount of timing advance used. The use of clipping is a trade off between dynamic range (quantization noise) and clipping noise.

Channel estimation is performed using a decision directed method, since all data frames are then used for updating the channel model. Known data frames are necessary only at start-up. Under certain conditions, the interference on the channel can be estimated using all data frames. This is important for early detection of changes in the channel transmission quality.

The basic principle for decision directed estimation is that differences between received data and known transmitted data are used for updating a channel model. At a certain stage of this process, the channel model is accurate enough to be used for equalization of the received data and the detector will produce correct data. This output data can then be used in the same way as the known data for further updating of the channel model. Therefore, the predefined data frames are no longer necessary and random data transmitted through the channel is used instead.

Figure 18:
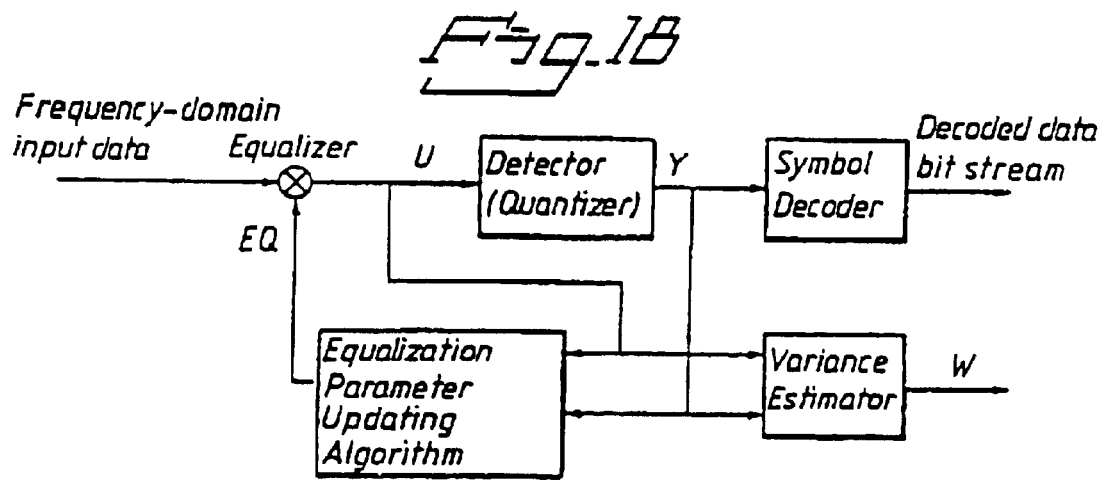
FIG. 18 illustrates, in schematic form, a decision directed channel estimation and equalisation system for use in the multi-tone carrier system modem, shown in FIG. 4.

By using data taken after the equalizer as one input and data after the detector as the other input, an adaptive updating algorithm can be designed. It modifies the equalization parameters in small steps in such directions that the equalizer converges towards a model of the channel inverse. FIG. 18 shows a block diagram of such a system. Frequency domain input data enters the equaliser and is multiplied by the output of an equalisation parameter updating unit, EQ. The resultant signal, U, is passed to a detector (quantizer) whose output is Y. Y is then passed to a symbol decoder which produces a decoded data bit stream. U and Y are also passed to an input of the equalization parameter updating unit and to a variance estimator. The output of the variance estimator is W.

An adaptive algorithm for estimating the equalizer parameters (EQ), using the equalized data (U) and the quantized data (Y) as inputs, is described by the following equation:

$$EQ_{k+1} = EQ_k + \frac{\mu}{|U_k|^2} \cdot EQ_k \cdot U_k^* \cdot (Y_k - U_k)$$

where $\mu$, is a positive constant ($\mu \ll 1$) that affects the adaption dynamics. A smaller value gives a slower adaption than a larger value, but it also gives a better robustness when there are disturbances on the input signals.

For implementation reasons, the division, shown in the equation, should be avoided. The expression $\mu/|U_k|^2$ has a too large dynamic range to be replaced by a constant. It is possible, though, to quantize this expression in a logarithmic fashion as shown below:

$$\frac{\mu}{|U_k|^2} \approx 2^{\text{integer}(2 \cdot \log_2 |U_k|) + \text{integer}(\log_2 \mu)}$$

The exponent of the above expression can be produced using the absolute value of $U_k$ as the input of a binary priority encoder and negating the output. Since the expression is an integer power of two, the multiplication operation in the algorithm is implemented using a barrel shifter.

The variance of the interference on each of the carriers is estimated using the standard method of integrating the squared deviations from a mean. In this case each quantized value, Y, is used as the mean for the range of data values, U, that are quantized to this Y. This method assumes that the symbol error rate is low enough for each data value to be associated with the correct mean. However, if suitable constellations are selected for the different carriers, this condition is fulfilled.

FIG. 18 shows the variance estimator as a part of the system. The algorithm used for the estimation is described by the following equation:

$$W_{k+1} = (1-\epsilon) \cdot W_k + e \cdot |Y_k u_k|^2$$

The integration is here replaced by an exponentially weighted averaging filter. The parameter $\epsilon$ is a small positive constant ($\epsilon \ll 1$) that affects the dynamic properties of the filter. This is not a critical parameter and selecting an E among integer powers of two will be sufficient.

If a value of $\epsilon$ is selected that gives a good variance estimate, the algorithm will not be able to detect sudden changes in the interference level. Therefore, a separate algorithm, working in parallel with the variance estimator, may be necessary for this task.

The system controller must have both read and write access to the memory holding the equalization parameters. Initialization of the parameters is necessary at start-up. Monitoring the parameters is also necessary to detect when they have adapted close enough to their final values.

The channel variance memory must be available for system controller read operations. Initialization of this memory to all zeroes can be connected to a system reset.

The parameters affecting the dynamics of the estimators must be accessible for write from the system controller.

The method, herein described, assumes a specific start-up sequence, both for the channel and the interference estimation. During normal execution it is dependent on a suitable selection of bit-loading, giving low enough symbol error rate.

It is important that the equalization parameters are initialized to unity value at the beginning of the start-up sequence, since the input data to the updating algorithm passes through the equalizer. The updating algorithm is sensitive to scale changes in the data path.

Any change of scaling in the transmitter must be compensated in the receiver. This also calls for special care in the use of the analog input gain control in the receiver.

Figure 19:
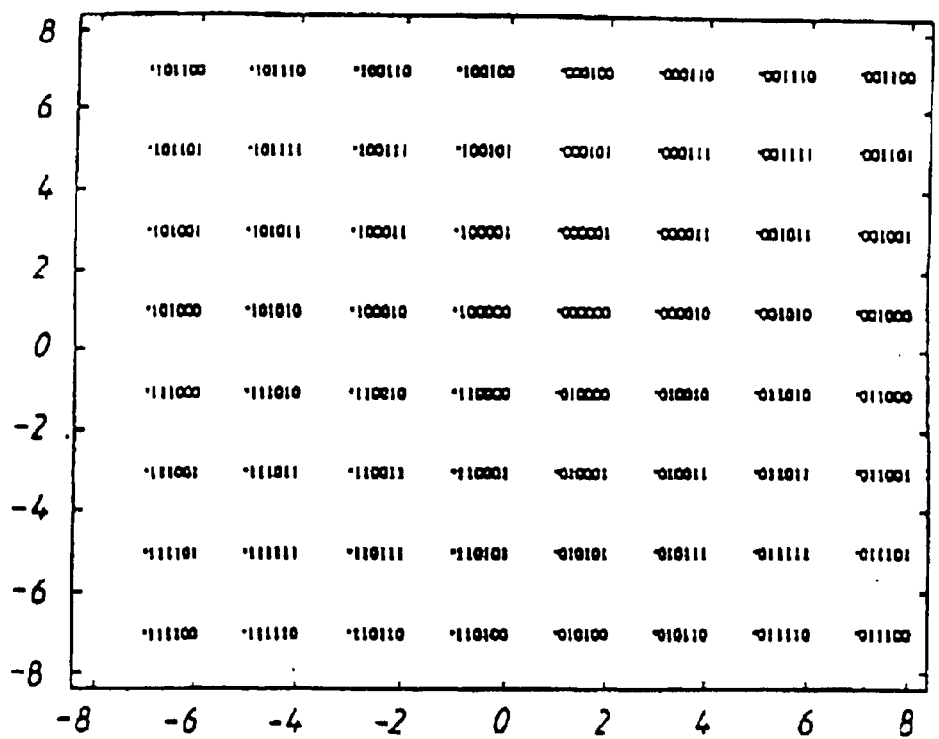
FIG. 19 illustrates, QAM encoding for b=6.

The symbol mapper, (encoder), maps a number of bits into a complex number (I, Q) which indirectly determines the phase and amplitude of a carrier. The mapping of all values of a certain bit length is called a constellation, and is illustrated in FIG. 19. The detection is the inverse function, that is, from a complex value, determining the value of the bits transmitted on the carrier. The number of bits sent on a certain carrier is determined by the bit-loading factor for that carrier.

The construction of a specific constellation is aimed at letting each point be as far removed, as possible, from all the other points. At the same time the average energy should be as low as possible. Another constraint is that the mapping and detection unit should be as simple as possible. The decision as to which constellation is to be used will, however, influence not only the symbol mapping and detection units, but also the bit loading and possibly the adaptive equalizer.

For a given carrier, the encoder selects an odd-integer point (I, Q) from the square-grid constellation based on the b bits ($v_{b-1}, v_{b-2}, \ldots v_1, v_2$). For convenience of description, these b bits are identified with an integer label whose binary representation is ($v_{b-1}, v_{b-2}, \ldots v_1, v_2$). For example, for b=2, the four constellation points are labelled 0, 1, 2, 3 corresponding to ($v_1, v_2$)=(0,0), (0,1), (1,0), (1,1), respectively.

For even values of b, the integer values I and Q of the constellation point (I, Q) are determined from the b bits ($v_{b-1}, v_{b-2}, \ldots v_1, v_2$) as follows. Split V into VI=($v_{b-1}, v_{b-3}, \ldots v_1$) and VQ=($v_{b-2}, v_{b-4}, \ldots v_0$). Then apply the inverse Gray code to V1 and VQ. This yields I and Q as I=2Gray'(VI)+1 and Q=2Gray'(VQ)+1.

FIG. 19. shows how the binary pattern of V maps onto I and Q given b=6.

Before these values are sent to the IFFT they are normalized by shifting them so that the msb of these numbers become the msb of the output (16−[b/2] steps left).

For a given carrier, the decoder uses a constellation point (I, Q) to determine the b bits ($v_{b-1}, v_{b-2}, \ldots v_1, v_2$). For convenience of description, these b bits are identified with an integer label whose binary representation is ($v_{b-1}, v_{b-2}, \ldots v_1, v_2$).

It is assumed that the values of I and Q are limited by saturation to the range (X, Y). To determine V the values I=($i_{15}, i_{14}, \ldots, i_1, i_0$) and Q=($q_{15}, q_{14}, \ldots, q_1, q_0$) are Gray coded and then combined into V as V=($gi_{15}, gq_{15}, gi_{14}, gq_{14}, \ldots$), where the upper b bits are valid.

The number of bits each carrier carries, depends on their respective Signal-to-Noise Ratios (SNR). The Signal-to-Noise Ratio is calculated for each carrier in the receiver. Based on the Signal-to-Noise Ratios, bit-loading factors are calculated for each carrier. Thus, the number of bits each carrier is to carry per transmitted symbol is decided. These bit-loading factors are calculated in an initial training session and can be updated if required. The MUSIC system uses 2-dimensional Quadrature Amplitude Modulation (QAM) on each carrier, with bit-loading factors varying from 0–12 bits.

The number of bits transmitted on each carrier may be expressed as:

$$\beta_i = b_i + \log_2(L) = \log_2\left(1 + \frac{SNR_i}{\Gamma}\right) \quad (1)$$

where $\Gamma$, the SNR gap, depends on modulation, possible coding and a system margin, and L is the constellation expansion due to the extra bits needed for coding. Using QAM constellations and some form of coding yields:

$$\Gamma = \frac{\left[Q^{-1}\left(\frac{P_s}{4}\right)\right]^2}{3} - \gamma_d + \gamma_{margin}(\text{dB}) \quad (2)$$

where $P_S$, is the desired symbol error rate, $Y_d$ is the gain of coding in the system, $\gamma_{margin}$ is the system margin. The system margin is a factor that is used to compensate for non-modelled losses, impulse noise etc. Equation (1) gives bit loading factors with infinite granularity. The bit-loading factors are rounded to give the supported factors (0–12 bits).

The rounding procedure will decrease the performance of the DMT system. If the energy distribution is allowed to vary energy-loading factors can be calculated for each carrier. This provides the possibility to tune the energy, so that (1) results in a bit-loading factor supported by the system. Tuning gives:

$$E_i = 2^{\frac{(\beta_i - 1)\Gamma}{SNR_i}} \quad (3)$$

This can however result in very large differences between carrier energies. In an environment with several different DMT systems, peculiar effects may occur if the different energies are allowed to vary too much. The Far-End Crosstalk (FEXT) will vary significantly in such an environment, and some DMT systems may get all the capacity of the cable. To prevent these effects, only small changes of the carrier energies can be allowed. Another limiting factor is the maximum energy that is allowed on each carrier.

The input data to the bit-loading algorithm will depend on the chosen frequency domain equalizer. If an adaptive DFE is used the SNR is given by:

$$SNR_i = W_i \quad (4)$$

where $W_i$ is the estimated interference variance described above.

For each carrier, a bit-loading factor and an energy-loading factor is calculated. The bit-loading factors may be represented with 3 bits, but to prepare the system for odd bit-loading factors as well, 4 bits are recommended. For energy-loading, n bits are used to give $2^n-1$ possible factors.

Figure 20:
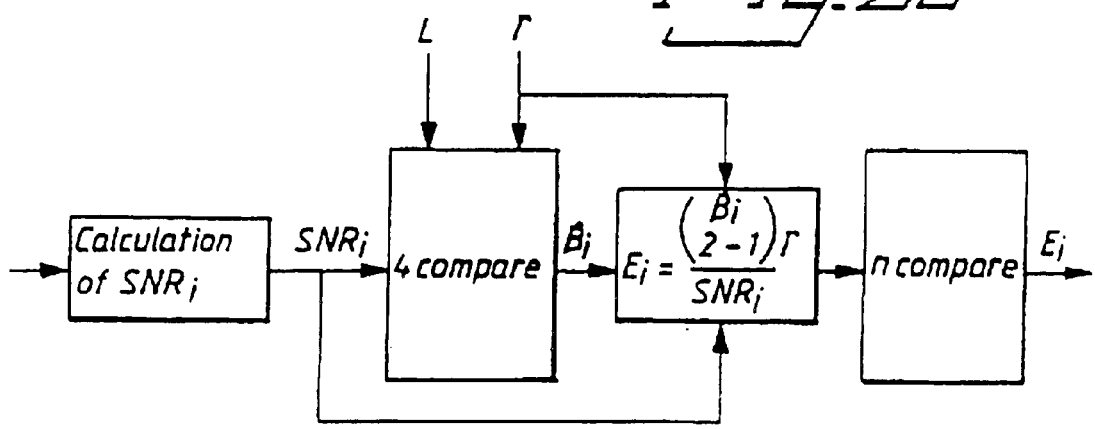
FIG. 20 illustrates, in schematic form, the realisation of the calculation of bit-loading and energy-loading factors employed in the multi-tone carrier system modem, shown in FIG. 4.

The implementation of the calculations of bit-loading and energy-loading factors can be made in four stages as illustrated in FIG. 20. To reach a given bit rate, a required SNR can be calculated and the system margin can be adjusted so that the desired bit rate is reached. The process, illustrated in FIG. 20, involves the following steps.

First the SNR is calculated using (4).

Second, four comparisons, that is one for each of the four bits representing the bit-loading factor, are carried out. The thresholds depends on L and $\Gamma$, and can be pre-calculated. The first comparison decides if the bit loading factor is greater than 7, the result of this comparison controls the first of the four bits representing the bit-loading factor, it also controls the threshold for the next comparison. In a similar way, this comparison control the second bit and the threshold for the next comparison. After the four comparisons, the bit-loading factor is definite.

The third step is to calculate the scale factor for the transmitted energy so that the channel is used more efficiently. The energy is scaled according to equation (3).

Finally, the scale factor is quantized to n bits.

It should be noted that to implement a system with constant energy loading, only the first two steps are necessary.

The energy loading and the shifting performed for normalization in the symbol mapping, determine the scaling and descaling factors sent to the IFFT/FFT processor.

The object of channel coding is to decrease bit error rate. The type of coding which should be used is dependent on the error pattern characteristics. Expected error sources include random noise (inducing random bit errors), impulse noise (inducing error bursts) and clipping (inducing error bursts).

Errors caused by impulse noise will primarily affect one, or two, bits per carrier. The probability for a single bit error on one carrier is always higher than the probability of 2 bit errors, which is in turn higher than the probability of 3 bit errors, and so on. This depends on the way the bits in a symbol are coded (i.e. Gray coding).

All coding depends on a synchronisation in order to determine the start-bit for the code-words and/or interleaving blocks. In a system, such as, the MUSIC modem, simple dead reckoning will be sufficient, since a data flow slip can never occur without loss of frame synchronization, or bit loading mis-adjustments. These errors will necessitate a partial, or full, system restart.

The channel coding will also include interleaving in order to increase the possibility of correcting burst errors.

Interleaving should be as deep as possible to obtain optimal working. The limiting factor on the depth is the time delay which is introduced into the system.

The difference between time and frequency interleaving is of small importance because the coding and interleaving function is not sensitive to frame boundaries.

Reed-Solomon codes have the drawback that they are primarily burst error correcting over a small number of bits (usually eight), a so called symbol. Burst errors from impulse noise will mostly introduce a single bit error in some of the symbols. To use the advantage of Reed Solomon codes, the most error prone bits have to be concentrated in one, or a few, of the Reed-Solomon symbols.

The system margin is, in itself, a sort of coding, using each carrier's margin as the symbol's redundancy. This, per symbol, redundancy should be converted to a shared redundancy that can be used by a larger number of symbols in order to handle burst errors. The higher coding rate that this imposes can be used by some types of convolutional code.

Using a convolutional code combined with soft information is, therefore, the optimal solution for a system with the MUSIC channel characteristics.

The convolutional code should be combined with interleaving. It is possible to use a top level Reed-Solomon code, or another burst error correcting code, e.g. Fire codes, in order to detect/correct the fig) remaining bit errors. This is especially useful as these errors appear in bursts as a result of the decoding of the convolutional code.

Figure 21:
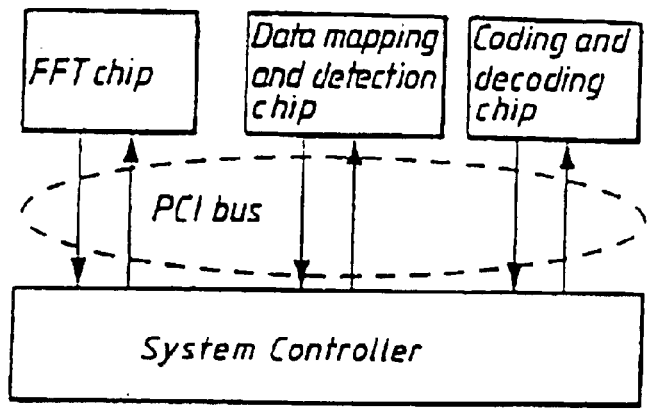
FIG. 21 illustrates, in schematic form, an overview of the system controller interface used in the multi-tone carrier system modem, shown in FIG. 4.

The system controller is based on a microcontroller, or signal processor, dependent on capacity requirements. For the MUSIC system the processor can be placed externally. A PCI-bus interface is used to connect the system controller and the different ASICs which make up the modem. Operation of the system controller is schematically illustrated in FIG. 21 which shows the interaction paths over a PCI bus, between the system controller and the FFT chip, the data mapping and detection chip, and the coding and decoding chip. Functions performed by the system controller are:

handling of Control Channel Signalling;
calculating bit loading and energy loading factors;
real time updating of system parameters; and
system supervision.

The system controller, used with the modem herein described, is programmable and accessible through an on-board JTAG interface.

Figure 22:
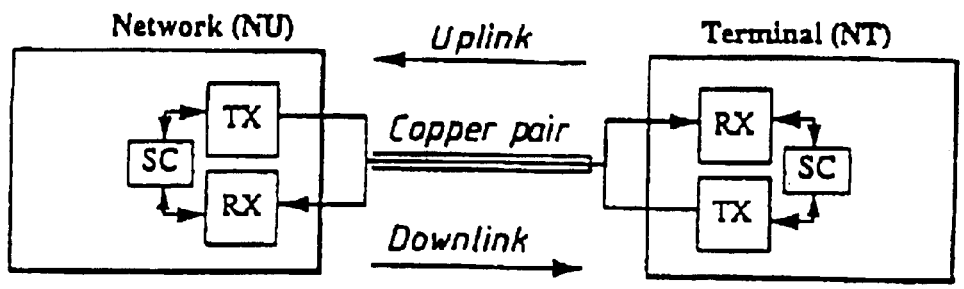
FIG. 22 illustrates, in schematic form, the manner in which two of the multi-tone carrier system modems, shown in FIG. 4, are interconnected to create a multi-tone carrier transmission system.

As shown in FIG. 22, in a modem connection, using modems herein described, the two data paths work independently of each other on the same physical copper cable, terminating in the network unit (NU) on the network side an the network termination (NT) on the user side. Both the transmitter Tx and receiver Rx are controlled by the system controller.

The system controller, after start-up, calculates and updates the bit loading and energy loading factors. This updating has to be done at the same time, starting from the same frame, on both the transmit and receive side.

The calculations are done and the updating is initiated on the receiving side. The Control Channel combined with the BSI clock is used to ensure the synchronisation of the updating.

The system controller also supervises the system. Indications of system failure include the control channel starting to indicate errors, or reception of too many errors from the channel decoding unit. The system controller can initiate restart on different levels; for example, go back to "idle mode", or make a complete start-up.

The Control Channel is a selected carrier that is only used for signalling between the two modems. The constellation on the carrier is initially 4 QAM and the data rate is approximately 16 kBit/s. The bit-loading can be changed to another constellation in order to increase the data rate.

The protocol on the Control Channel is partly based on HDLC for the physical layer. This means that the messages are packed as a number of octets with use of "flag sequence" and "bit-stuffing". A 16-bit "frame check sequence" ensures that every message is received correctly.

The "flag sequence", "bit-stuffing" and "frame check sequence" are handled in the hardware on the mapping and detection chip. The content of the messages is handled by the system controller.

The maximum message length is limited to octets due to the size of the buffers on the mapping and detection chip.

Higher level protocols can partly be based on the CCITT Q.921 recommendations.

Figure 23:
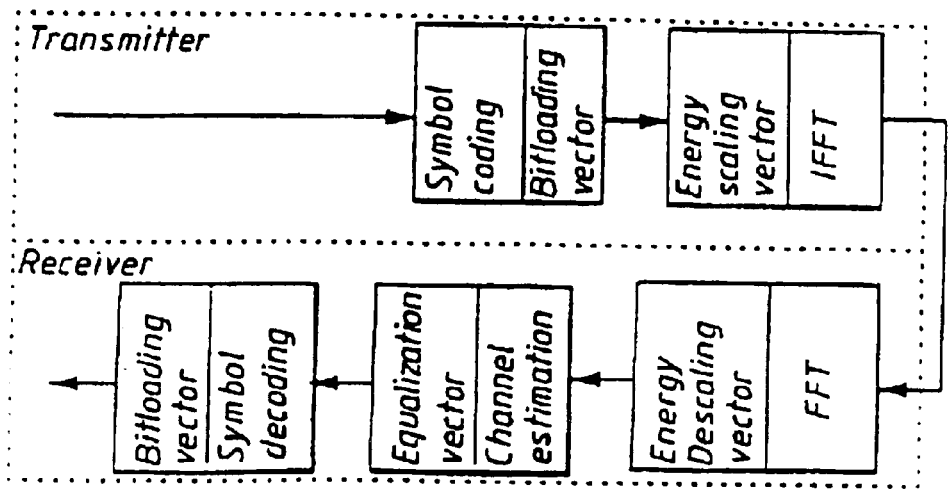
FIG. 23 illustrates, in schematic form, the vector management system employed in the multi-tone carrier system modem, shown in FIG. 4.

In the MUSIC modem SC, several different vectors are managed, these are illustrated, schematically, in FIG. 23.

For the transmitter part there are the bit-loading, and energy scaling vector. Correspondingly on the receiver side there are the bit-loading, descaling and equalization vector.

As previously described, the pilot carrier delivers a transmitter/receiver synchronization by sending and detecting a specific pattern. This clock is used by the system to synchronize changes in the transmitter and receiver vectors.

Figure 24:
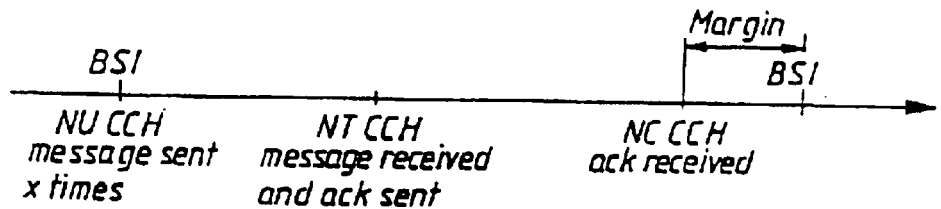
FIG. 24 illustrates, BSI length.

The time between the pilot synchronization pattern is called base sync interval (BSI) and is determined b the system response time, as shown in FIG. 24.

This BSI is hardware dependent. Its length will not be changed, since the response time always stays the same.

Figure 25:
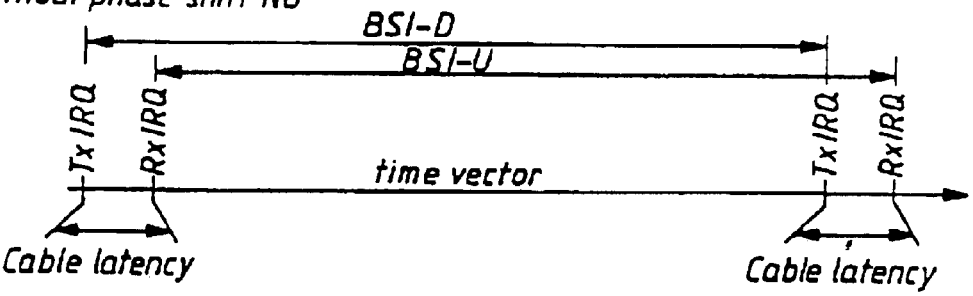
FIG. 25 illustrates, in schematic form, NV SC load distribution for BSI interrupts for the multi-tone carrier system modem, shown in FIG. 4.

When the system is up and running there will be a synchronization, between the uplink transmitter and receiver, by the base sync interval uplink (BSI-U) and the base synch interval downlink (BSI-D), see FIG. 25. These BSI are of the exact same length but are shifted half the BSI interval.

The SC at the NU, or NT, will receive interrupts for bo th BSI-U and BSI-D.

For the NU there will be a transmitting BSI-D interrupt and a receiving BSI-U interrupt. By shifting the BSI-U by BSI/2, the SC load will be better distributed over the BSI period.

The bit-loading vector supplies the system with the modulation pattern for each carrier. This is a vector that needs to be held and updated, at exactly the same time for the transmitter and the receiver side, in order to supply an error free connection. By using the BSI, the vector is changed synchronously on the receiver and the transmitter side.

The bit-loading factors, constellations that are used on each carrier, are handled by two memories for receiving and two memories for transmitting on the mapping and detection chip. Each of the four memories contains a 4-bit word for each carrier (1024×4).

The system controller points to which of the memories will be used for transmit and which will be used for receive after the start from next BSI interval.

The bit loading factor can have values between 0 and 12 where 0 denotes an unused carrier, 1–12 denote the number of bits in the constellation (e.g. 2 for 4QAM, 4 for 16 QAM, 10 for 1024 QAM).

The energy vector holds information on how the carriers are scaled/descaled in energy. This is a vector that needs to be updated synchronously, otherwise it will generate a distorted channel estimate and bit errors. The scaling vector will also be used as a mask for cancelled carriers.

Scaling of the different carriers on the transmitter side is handled by a memory area on the FFT chip. The memory consists of one 16-bit word for each go carrier (1024×16). These values are multiplied by the vector for each carrier in the frequency domain (I and Q are multiplied with the value separately).

The memory is doubled in order to ensure a synchronous updating. The system controller points to which of the two memories will be used from the start of the next BSI interval.

A corresponding memory (doubled) is implemented on the receiving side in order to rescale the carriers before symbol detection. If these memories contain a complex value for each carrier (32 bits/carrier), only the I value will be used for rescaling.

The scaling and rescaling factors have values between 0.5 and 2.0. The value 0 is used for carrier cancelling.

The equalization vector is used to equalize the received frame according to the channel characteristics. This vector is updated periodically, independent of the other side, as the channel estimate is calculated by the receiver.

Depending on the specific transmission characteristics of a carrier, it will be assigned one of the following modes:

ordinary carrier—this carrier transmits data correspondingly to the calculated bit-loading value and are transmitter scaled and receiver descaled;

cancelled carrier—no energy is to be transmitted on this frequency and the scaling vector is, therefore, set to zero; or bad carrier, the SNR is too low to transmit any data and the bit-loading is therefore set to zero.

For carrier mode 1 (CM1) the system operates as normal. The receiver continuously estimates the channel. Equalization changes are made for each new estimate. Using the characteristics, the SC calculates the optimal bit-loading factor. This value is transferred to the transmitter using the CCH and a synchronous change is made.

For carrier mode 2 (CM2) the energy scaled/descaled value is set to zero to disable any output/input energy. The bit-loading vector value is also set to zero to indicate that the carrier is disabled. For this carrier no channel estimate can be made.

For carrier mode 3 (CM3) the receiver has calculated a zero for the bit-loading factor. On the transmitter side, this means that no data can be transmitted and, therefore, no channel estimate can be made at the receiver. To avoid this, the corresponding carrier value from the sync frame is sent, enabling channel estimation to be performed at the receiver. The scaling/descaling value can be used to lower the output power. The carrier modes are summarised in Table 4. The basic functionality for the system start-up sequence, i.e. cold and warm boot, is now considered.

Initially the system is considered to be powered off at one, or both, ends, NU and NT. This occurs if power is lost by power failure, or by the user unplugging the NT equipment. The main considerations for the start-up is, besides the connection function, minimizing the interference level for other modems running on neighbouring cables.

The various frame types employed by the system are considered below.
1. The synch frame is used for channel estimation. This frame holds a fixed modulation pattern for every carrier, thereby enabling easy channel estimation. By letting the modulation pattern be described by a random sequence, the cross correlation inside the frame is kept low so that the frame correlation, used for synchronization, is improved.
2. Data frame 1, (DF1), carries random data on all carriers, except for four predefined carriers that transmit the control channel (CCH) in parallel. It is used at start-up when the CCH carrier is undetermined and enables the receiver to select the least disturbed carrier, thereby securing the CCH connection.
3. Data frame 2(DF2) carries random data on all carriers except one, which bears the control channel (CCH). It is used when the CCH carrier has been determined and the bit-loading factors are still not set.
4. Data frame 3 (DF3) carries data and makes use of the bit-loading functionality to maximize the bandwidth. One carrier is always dedicated to the control channel (CCH).

Figure 26:
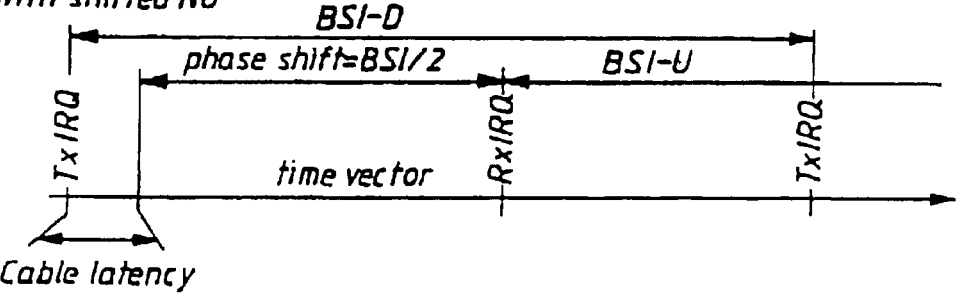
FIG. 26 illustrates the SUS pattern for the multi-tone carrier system modem, shown in FIG. 4.

The system uses a special frame sequence, shown in FIG. 26, at start-up and in idle mode, called the start-up sequence (SUS).

The SUS can be composed by using the different data frames, DF1 and DF2, which are, accordingly, named SUS1 and SUS2. In the SUS frame sequence, the synch frames are used for channel estimation.

Figure 27:
FIG. 27 illustrates the DAS pattern in schematic form, for the multi-tone carrier system modem, shown in FIG. 4.

After the start-up, the synch frames are replaced with data frames, as shown in FIG. 27, and the channel estimation process switches from using synch frames to using the data frame. The data frame type for this sequence is DF3.

At system start, neither side of the modem, NU and NT, are transmitting any energy over the copper pair. The default set-up for each side, in this state, is to run the receiver, leaving the transmitter dead.

The receiver, on each side, tries to perform a frame correlation to detect a frame start. This correlation is run through a threshold function giving the receiver a distinct indication when the other side starts sending. It is this indication that operates as a wake-up signal.

The wake-up signal is only used by the NT side. If the decision to start-up is made on the NU side, the system goes directly to the "Set-up sequence", described below.

This part of the start-up procedure is timed out if a transition to the "Set-up sequence" is not detected.

Figure 28:
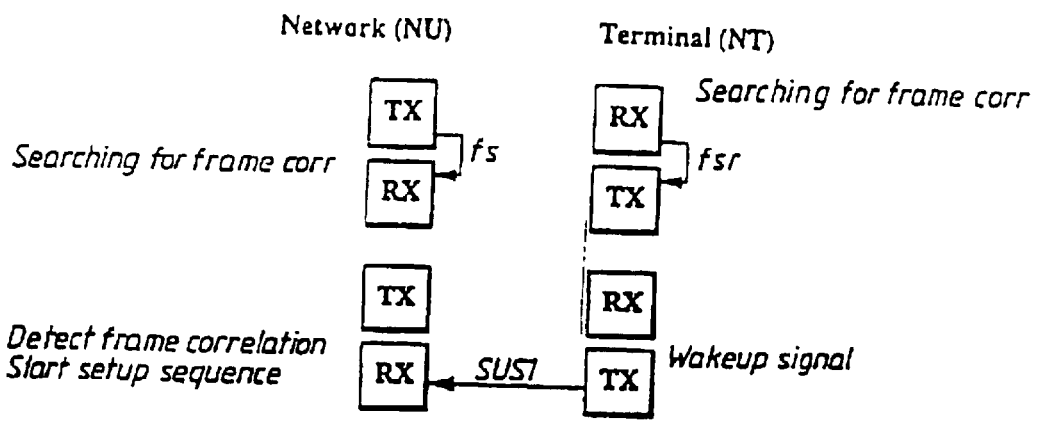
FIG. 28 illustrates, in schematic form, wake-up signalling for the multi-tone carrier system modem, shown in FIG. 4.

The basic modem wake-up signalling is illustrated in FIG. 28. Initially both modems are searching for frame correlation. One modem, on the right of FIG. 28, transmits a wake-up signal, in the form of a SUS1. The other modem detects frame correlation and starts the set-up sequence, described below.

When the wake-up state is passed, the network side (NU) initiates the "Set-up sequence".

The set-up sequence will now be considered. This set-up sequence starts after the network side has detected a wake-up signal, or the network initiates the setup.

Figure 29:
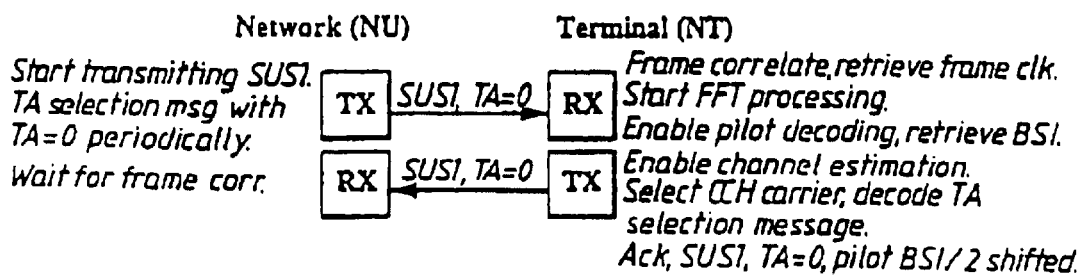
FIGS. 29 to 31 illustrate the set-up sequence for the multi-tone carrier system modem, shown in FIG. 4.

The first step of the set-up sequence is illustrated in FIG. 29. In this phase the NU starts to send the SUS1 pattern. The NU repeatedly transmits a timing advance (TA) setting, with TA=zero, message on the CCH. The master clock in the system is now the NU transmit frame and sample clock. The pilot is transmitted continuously.

The NT receiver side, searching for frame correlation, detects frames and can retrieve the frame and sample clock. It now starts the channel estimation which at the current rate of sync frames calculates an accurate estimate within 300 msec. Using this estimate, the receiver starts polling the predefined CCH carriers and, upon message receive, selects this carrier for the CCH. The NT transmitter now starts with TA=0 for local timing and sends the ack on the CCH carrier for each received TA selection message, repeating the received TA value. It also shifts the outgoing pilot by BSI/2 from the incoming pilot, so that the SC load is distributed over time. When the NU detects the frame correlation, the transition to step 2, of the set-up sequence is made.

Thus, step 1 of the set-up sequence commences with the transmitter, in the network unit modem, transmitting a SUS1 and a TA message with TA=0 at periodic intervals. On receipt of this, the receiver of the terminal modem:

performs frame correlation and retrieves the frame clock;

commences FFT processing;

enables pilot decoding;

retrieves the BSI;

enables channel estimation;

selects a CCH; and decodes the TA selection message. The transmitter in the terminal unit then transmits an ack, SUS1, a TA=0 message and a pilot shifted by BSI/2. The receiver in the network unit waits for frame correlation.

Figure 30:
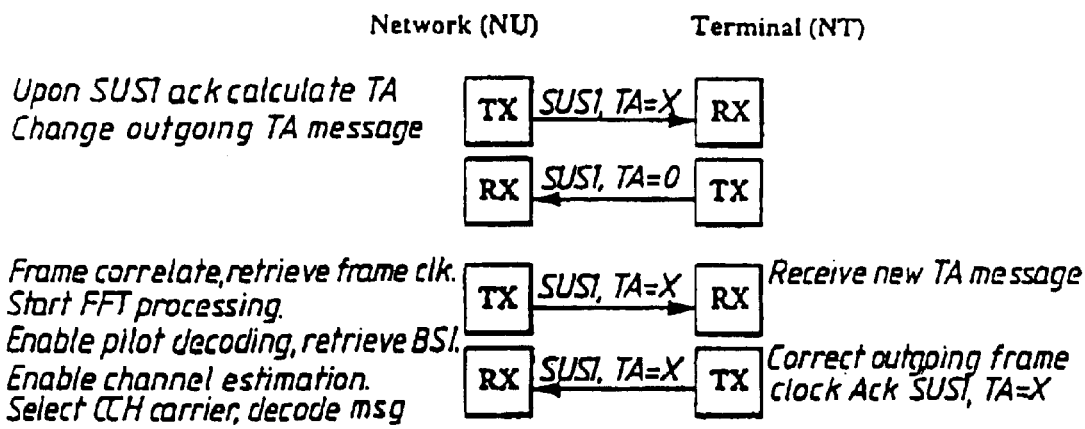

Step 2 of set-up sequence, see FIG. 30, commences with the NU side now calculating a timing advance value (TA). The CCH message is changed to the new, corrected, TA value.

When the NT side receives the new TA value it changes the local timing and continues to send the ack message, with a new TA value, for every TA selection message.

On the NU receiver, the frame clock is lost, due to the NT transmitter changing frame clock, and the unit needs to recorrelate. After the frame clock has been retrieved the CCH is decoded and, upon ack detection, containing the new TA value, the system terminates the TA message and goes to the third step of the set-up sequence.

Thus, step 2 of the set-up sequence starts with the transmitter in the network unit, NU, transmitting a TA message containing the correct TA, say X, together with a SUS1, in response to the SUS1 and TA=0 message transmitted from the terminal transmitter. The terminal unit, NT:

receives the new TA message;

corrects the outgoing frame clock; and transmits an ack SUS1 and TA=X.

The network unit, NU performs frame correlation;

retrieves the frame clock;

starts FFT processing;

enables pilot decoding;

retrieves the BSI;

enables channel estimation;

selects a CCH; and decodes the message.

Figure 31:
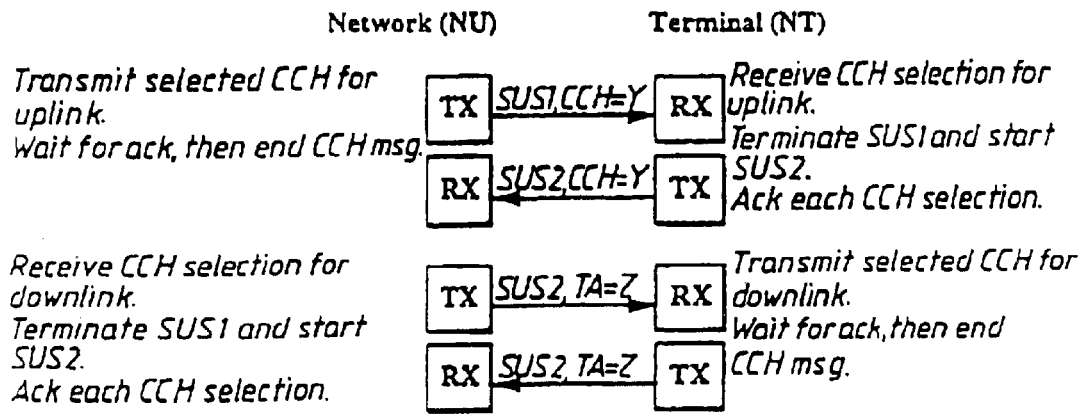

The last set-up sequence, step 3, see FIG. 31, handles the CCH choice for uplink and downlink. For the uplink, the NU receiver has selected the most suitable carrier and sends a CCH message containing this selection to the NT side. The message is sent repeatedly until it receives an ack.

On the NT side, the receiver decodes the CCH message and terminates the SUS1 and transmits a SUS2 i.e. terminates parallel CCH transmission only transmitting the CCH on the selected carrier.

The uplink CCH carrier has now been configured. For the downlink, the same steps are performed in parallel, initiated through the NT side after reception of the first CCH selection message from NU.

Thus, in step 3 the network unit:

transmits the selected CCH for the uplink;

waits for an ack; and ends the CCH message.

The terminal unit:

receives the CCH selection for the uplink;

terminates SUS1;

starts SUS2; and acknowledges each CCH selection.

The network unit then:

receives the CCH selection for the downlink;

terminates SUS1;

starts SUS2; a nd acknowledges each CCH selection.

The terminal unit:

transmits the selected CCH for the downlnk;

waits for an ack; a nd ends the CCH message.

When these steps have been taken, the modem has reached idle mode, sending SUS2. Using the CCH, the bit-loading factors can now be changed according to channel characteristics and DAS transmission commences.

The present invention relates to the synchronous updating of bit-loading factors in multi-carrier transmission systems. The precise manner in which this is achieved will, therefore, now be considered in greater detail. It should be emphasised that the present invention can be used not only with the MUSIC system as herein described, but with other multi-carrier systems employing dynamic bit-loading.

At system start-up, the control channel is configured and established, according to a predetermined sequence, to ensure that a connection is established. The procedure for start-up can be described in three steps. These steps assume that the receiver is synchronized to the transmitter, as described above.

The uplink transceiver is the unit which is responsible for the decision feedback of the system.

The task of the downlink transceiver, therefore, consists of effecting system changes, according to the decisions made in the uplink transceiver, estimating the channel and forwarding this information to the uplink transceiver.

Figure 33:
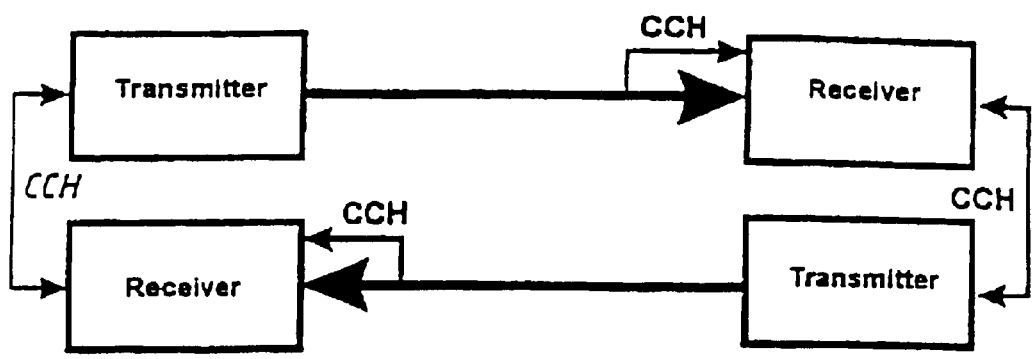
FIG. 33 is a diagrammatic illustration of the control channel architecture employed by the present invention.

This configuration is chosen to facilitate central system operation in which many duplex connections can emanate from the same point (the uplink). The channel connection architecture is illustrated in FIG. 33, in which the control channel links between receiver and transmitter within a transceiver are shown, together with the control channel links between transceivers. As can clearly be seen, the architecture is symmetric between uplink and downlink transceivers, hence these are not distinguishable in the diagram.

Figure 35:
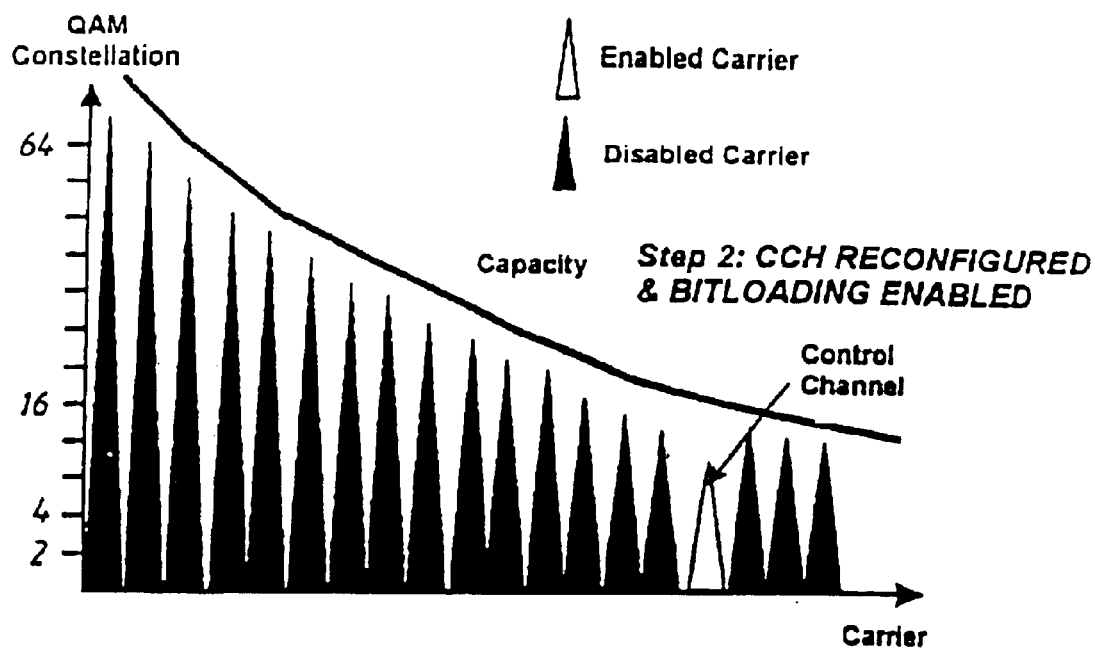
FIG. 35 illustrates control channel reallocation.
Figure 36:
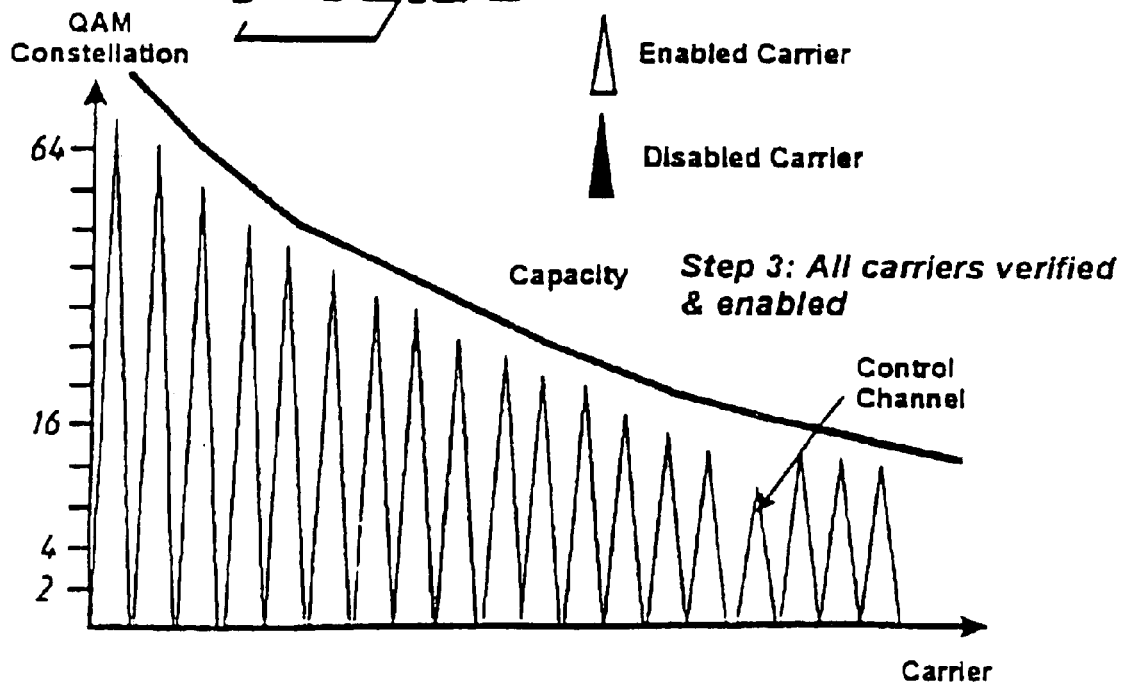
FIG. 36 illustrates the channel configuration in a fully configured system.
Figure 40:
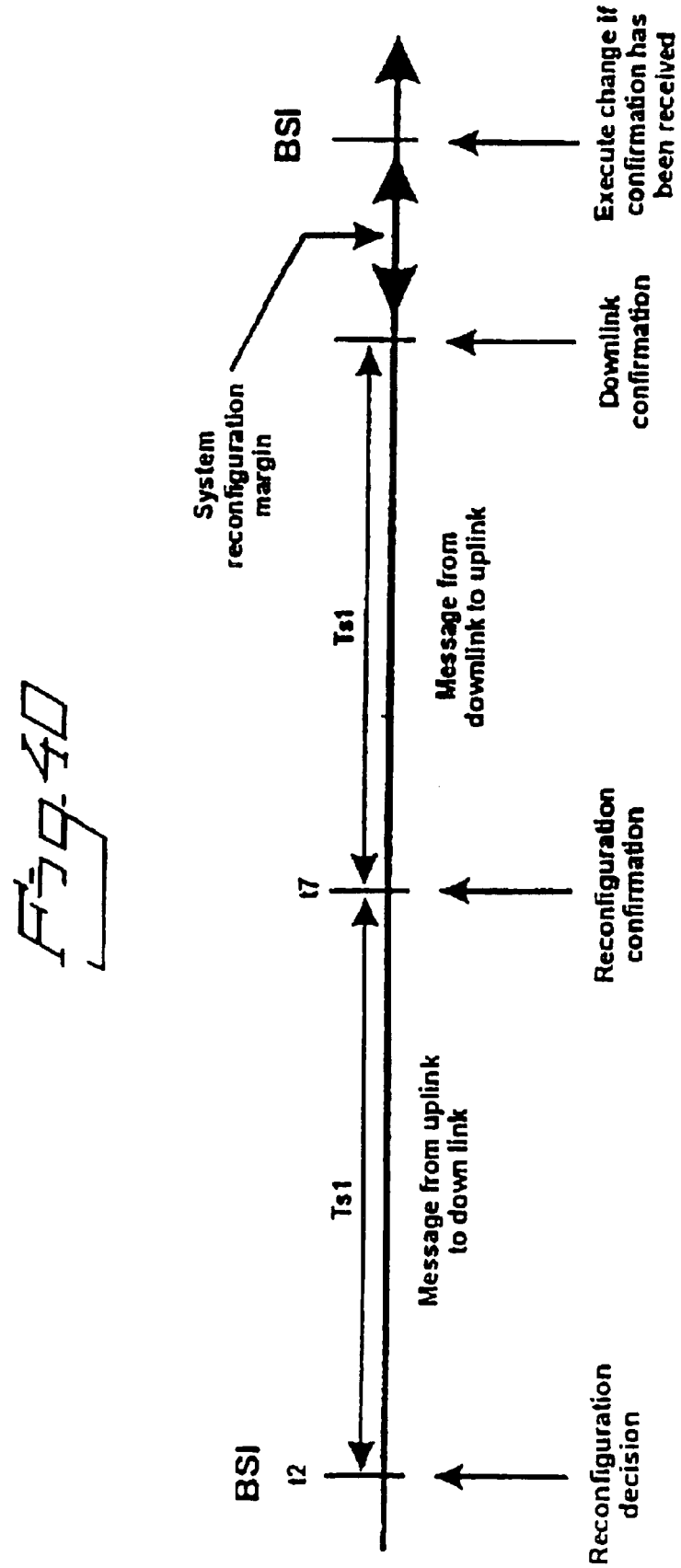
FIG. 40 shows signal timing.

The three steps by which a control channel is established will now be described with particular reference to FIGS. 34 to 36.

Step 1: The Establishment of a Safe Control Channel.

After the receiver has been synchronized with the transmitter, it is necessary to establish a control channel. The control channel is, in this case, a connection from the transmitter to the receiver.

In a duplex system this connection will be a two-way connection since both the uplink transceiver and downlink transceiver contain a transmitter and a receiver, see FIG. 33.

The establishment of this channel is an absolute requirement as further configuration is impossible without a connection between the transmitter and the receiver.

In the multi-carrier technique, dispersal of the connection over many carrier waves makes it natural to allocate a separate carrier wave for the control channel.

In ADSL/VDSL applications there is, prior to establishment of a control channel, an idea of the channel characteristics, see above. It is known, for example, that certain carrier waves will deliver a much higher SNR than others. By using this information and choosing one of these carrier waves for the control channel the probability of establishing a connection is improved.

Figure 34:
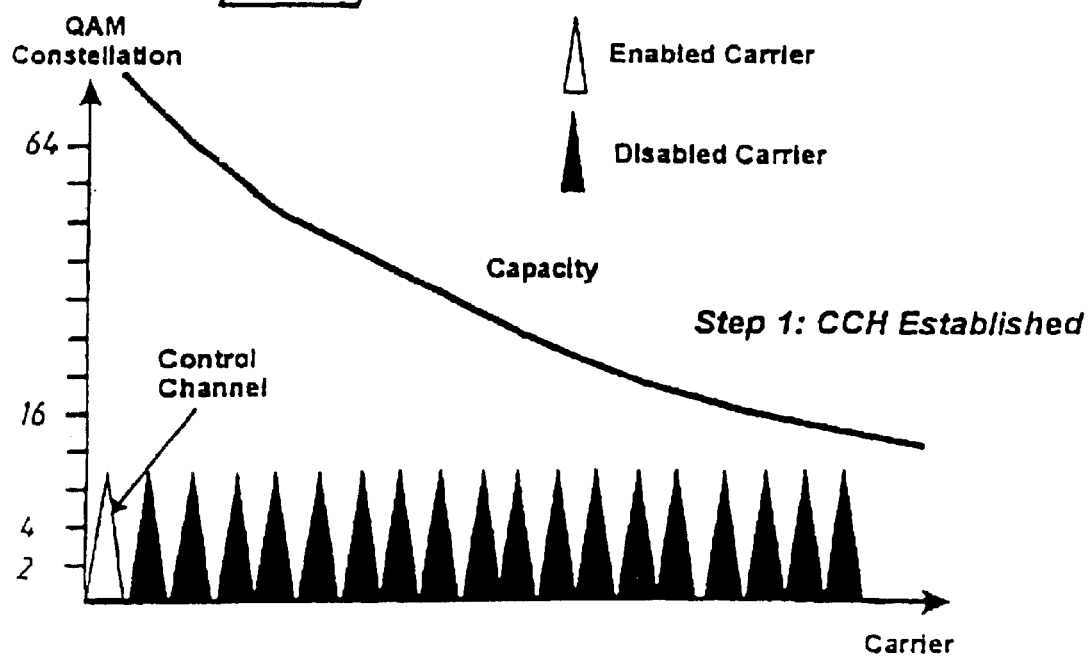
FIG. 34 illustrates primary control channel set-up.

FIG. 34 illustrates the establishment of an initial, or primary, control channel on a high capacity carrier. The carrier selected for this, is a preset system parameter.

During step 1 the following data/information is, or becomes, available to both the transmitter and receiver:

Sync frame appearance;

Carrier wave for the control channel (primary); and

SNR estimation of the channel (rough).

The transmitters in both the uplink and downlink transceivers undergo/perform the following events, processes:

boot;

continuously transmit frames with random data, except for the carrier wave of the control channel; a nd transmit a system "heartbeat" on the control channel.

The receivers in both the uplink and downlink transceivers undergo/perform the following events, processes:

boot;

initiation of channel equalization for straight equalisation;

synchronization;

after synchronization, establishment of the control channel;

on receiving the "heartbeat" the channel is considered to be established.

After the channel has been established on a carrier wave, determined in advance, the system proceeds to step 2. At the start of step 2, none of the other carrier waves has been configured, or decoded. During step 2 the control channel is reallocated.

Step 2 assumes that the control channel has been established according to step 1. This means that the transmitter and receiver may exchange information about the control channel based on the estimations made by the receivers in the downlink and uplink transceivers. This implies that the system can move the control channel to a carrier wave with an SNR better suited to the function of that channel, i.e. a channel which has a smaller SNR margin.

This rearrangement gives a larger total bandwidth for user data since a narrow band channel can be selected as the control channel. The system margin for the SNR level on this carrier wave is chosen to be somewhat higher than for the other carrier waves with the purpose of obtaining a more stable channel, i.e. it is operated below its full data carrying capacity. The selection of a new control channel is illustrated in FIG. 35.

Information about the new control channel is transmitted, via the control channel established in step 1, and the step 1 control channel connection is disconnected. The system now tries to establish the control channel on the new carrier wave. If this has not occurred within a predetermined time period the system will return to step 1.

During step 2 the following data/information is, or becomes, available to both the transmitter and receiver:

sync frame appearance;

carrier wave for the control channel (primary);

SNR estimation of the channel from uplink and downlink (measured); and reallocation carrier wave for the control channel.

The transmitter in the uplink transceiver undergoes/performs the following events, processes:

receives information about the measured channel from the uplink and downlink receivers;

decides on the reallocation of the carrier wave for the control channel;

transmits information about the new control channel carrier wave to the downlink;

terminates the control channel at confirmation from the downlink via the receiver uplink; and starts the system heartbeat on the new carrier wave.

The receiver in the uplink transceiver undergoes/performs the following events, processes:

measures the channel characteristics and transmits the information to the uplink transmitter;

equalizes the channel according to measured channel data;

obtains channel estimation from the downlink transceiver and transmits the information to the uplink transmitter;

obtains a decision about a new control channel carrier wave from the uplink transmitter;

receives confirmation from the downlink transmitter;

terminates the control channel; and tries to establish the control channel on a new carrier wave; if this has not occurred within a time period t1 the system restarts step 1.

When the control channel has been established on the new carrier wave the system is ready to proceed to the last step, step 3, which is the configuration of the total connection.

Step 3 assumes that the control channel has been reallocated in accordance with step 2. Because the transmitter and the receiver can now exchange information, the rest of the carrier waves can be configured and activated. This is illustrated in FIG. 36.

During step 3 the following data/information is, or becomes, available to both the transmitter and receiver:

sync frame appearance;

channel estimations from uplink and downlink (measured);

carrier wave for the control channel;

The transmitter in the uplink transceiver continuously undergoes/performs the following events, processes:

obtains information about measured channels from the uplink and downlink receivers;

decides on the bit-loading for each carrier wave;

transmits the bit-loading diagram (constellation) to the downlink transceiver;

changes the bit-loading diagram on confirmation from the downlink transceiver via the uplink receiver.

The receiver in the uplink transceiver continuously undergoes/performs the following events, processes:

measures the channel and transmits information to the uplink receiver;

equalizes the channel according to measured channel data;

obtains channel estimations from the downlink transciever and transmits the information to the uplink receiver;

obtains decisions about new bit-loading diagrams;

obtains confirmation from the downlink; and updates the bit-loading diagram.

The multi-carrier transmission system of the present invention uses a particular reference frame to estimate the characteristics of the channel, herein called the sync frame.

By transmitting a frame with predetermined content, which the receiver can compare, on detection, with a reference frame, the receiver can estimate the characteristics of the channel, over which the frame is transmitted, in terms of attenuation, phase shift and variance.

Depending on the speed of channel estimation that is required, these frames are transmitted more, or less, frequently.

FIG. 37 shows an example in which a sync frame is transmitted after every sixth user data frame. This base distance may vary from system to system.

The concept of a base synchronization interval (BSI) will now be considered. This is defined as the distance between the sync frames during the system start-up (step 2 above).

By means of simple logic in the receiver, the BSI can be calculated and locked so that the receiver and transmitter hold a local reference indicating the base sync-frames.

The distance between these frames can be shortened by introducing one, or more, additional sync-frames between the base sync-frames. These are introduced in multiples of the distance of the base interval, see Table 5. The requirement for this is that the base sync distance is a power of 2.

A simple diagram illustrating this updating process from one base sync frame to 7 additional sync frames per base frame is shown in FIG. 38 for a system with BSI=16.

The base sync interval is not changed by the introduction of additional sync frames. The updating frequency of channel estimation is doubled for each step increase in the number of sync frames, see column 1 of Table 5.

The BSI provides a reference clock which can be used to initiate system configuration changes.

A transmitted command relating to system changes is transmitted through the system, from the receiver to the transmitter, via the control channel. Such a command is generated by means of a decision feedback based on channel information in the receiver. An important factor in the command signalling chain is the different execution times for different system components in the signal path.

An overview of the signal flow, from the receiver to the transmitter, is illustrated in FIG. 39.

When the receiver has received a message about reconfiguration at, time point t7, see FIG. 39, a confirmation is transmitted. This confirmation has the same, or shorter, signal transit time, since it follows the same path through the system as the initiating signal, but contains less data.

Reconfiguration signalling is chosen to start at the beginning of a new BSI interval for execution of reconfiguration changes at the start of the next BSI.

By choosing BSI>2*Tsl the system will effect the change synchronously.

If confirmation has not been received before the next BSI interval, the change will not be executed which, if the confirmation is destroyed, leads to the disconnection of the connection. By transmitting multiple confirmations the probability of this happening is reduced.

The method herein described for updating of bit-loading factors may be used in different types of DMT systems.

The present invention provides a simple and reliable way of meeting synchronous updating requirements. By means of the dynamic configuration, greater possibilities are given to adapt the implementation to several multi-carrier systems.

Figure 32:
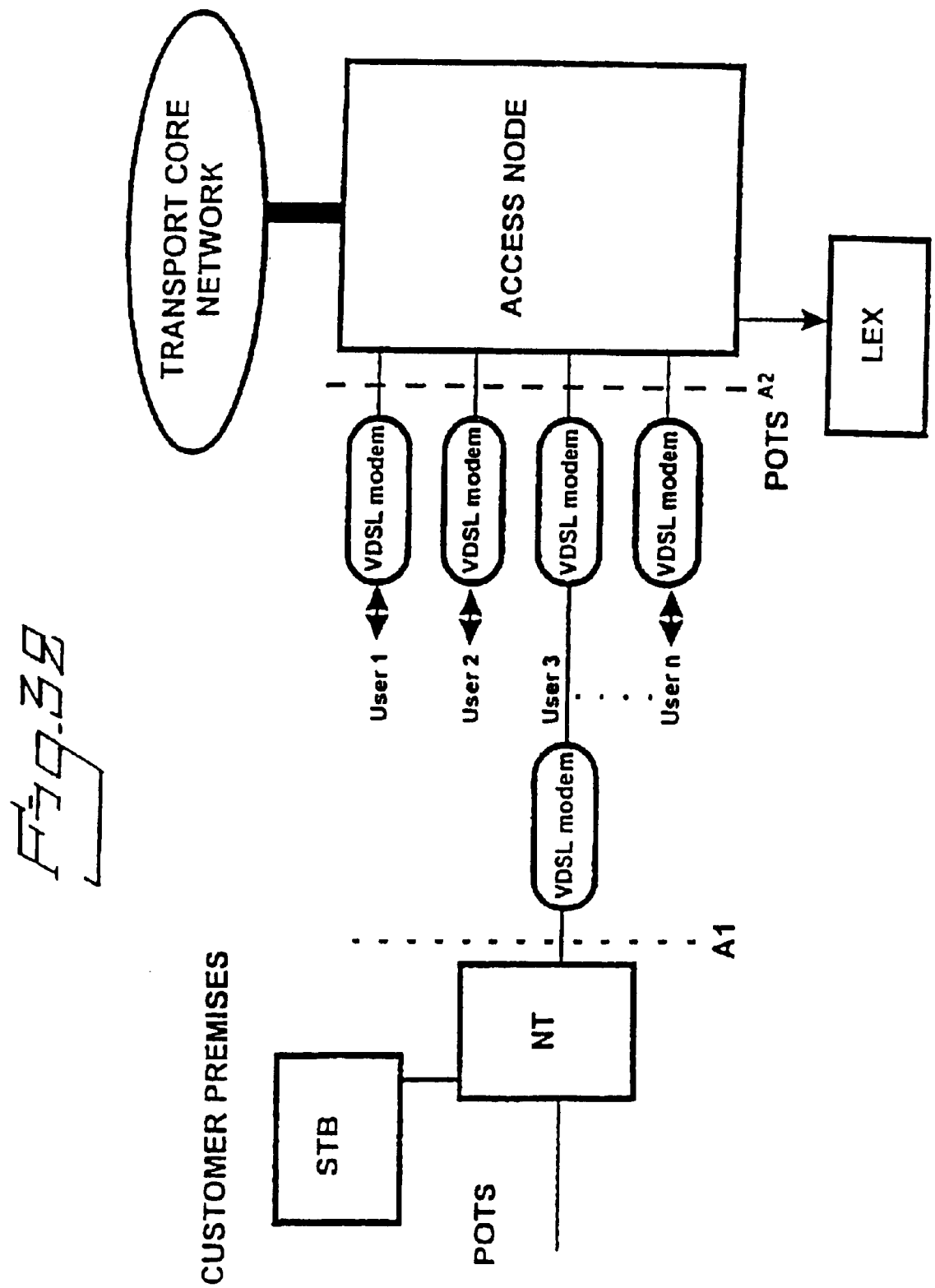
FIG. 32 illustrates, in schematic form, a network overview for a VDSL modem application network interface.

The VDSL modem can interface different network elements, depending on the physical location of the modem, i.e. at the access node premises, or at the customer premises. At the customer premises, the VDSL modem can interface an active network termination equipment. At the access node, the VDSL modem will interface an access specific interface, see FIG. 32, which shows a logical view of the networks elements that interface the VDSL modem.

The VDSL modem may be integrated physically with the network termination equipment, and the VDSL modem, at the access node, may be physically situated in the cabinet in which the access node is located. The NT (interface A1) and the Access Node (interface A2) demand a layer 1 frame format from the VDSL modem. Integrated in the layer 1 frame are, apart from the frame header and payload, a number of information fields for management and control information. These management and control fields include different alarm indicators such as SDH alarms e.g. AIS (valid only if SDH is taken all the way to the customer premises) bit error rate measurements for performance monitoring, indications of whether synchronization is bad, or lost, equipment handling alarms for power loss and high temperature etc. The management fields also includes activation for different loop tests on the modem, for operation and maintenance purposes.

TABLE 1

System Parameters for the Overall system

| | |
|---|---|
| Orthogonality between modems | No |
| Duplex method | Separate bands |
| Frequency space between up/down data stream | Dependent on the duplex filter characteristics |
| Net bit rate | |
| up stream | 2 Mbps |
| down stream | 13 or 26 Mbps |

TABLE 1-continued

System Parameters for the Overall system

| | |
|---|---|
| Gross it rate | |
| up stream | Coding dependent |
| down stream | Coding dependent |
| Cable length | <1300 meters |
| Cable Bandwidth | 10 Mhz |
| Single carrier modulation | |
| up stream | 0–4096 QAM |
| down stream | 0–4096 QAM |
| Total no. of carriers | 1024 |
| Bandwidth of each carrier | 9.77 kHz |
| Cyclic prefix | 128 sample (carrier) |
| Modulation | DMT |
| Access technology | VDSL |
| Signal power | −60 dBm/Hz |
| Bit error rate | $10^{-7}$ |
| Interleaving delay | 0.5 ms |
| System margin | 6 dB |
| CCH | |
| bandwidth | 1 carrier, minimum 16 kbps |
| protocol | HDLC |
| Sample clk | 20 MHz ± 10 ppm |
| Frame clk | 20 MHz/(2048 + 112) = 9.19 kHz |

TABLE 2

System Parameters for the Transmitter

| | |
|---|---|
| Interleaving | |
| depth | 2 × frames |
| delay | 0.5 ms |
| DAC resolution | 84 dB |
| Clipping Algorithm | No |
| IFFT | |
| type | Real |
| points | 2048 |
| resolution | 16 bits |
| LP-filter | LP 10 MHz |
| Bit loading | Yes, 0, 2, 4, 6, 8, 10, 12 bits |
| Energy loading | Yes, 4 bits |
| BSI distance | 1 s |

TABLE 3

System Parameters for the Receiver

| | |
|---|---|
| ADC resolution | 66 dB |
| FFT | |
| type | Real |
| points | 2048 |
| resolution | 16 bits |
| LP-filter | LP 10 MHz |
| Synchronisation | |
| jitter | <0.5 ns |
| VCXO | ±25 ppm, 10 ppm/V sensitivity |
| DAC | 18 bits, 0–5 V range |
| resolution | 1/100 of a sample |

TABLE 4

Carrier Modes

| Mode | Transmit | Bitloading | Equalize | Scaling |
|---|---|---|---|---|
| CM1 | Data | 2–12 | Yes | Yes |
| CM2 | No | 0 | No | 0 |
| CM3 | Sync info | 0 | Yes, sync | Yes, low |

TABLE 5

Addition of Extra Sync Frames

| Step | Distance between base frames | Distance between sync frames | No. of extra sync frames between base frames |
|---|---|---|---|
| 1 | BSI | BSI | 0 |
| 2 | BSI | BSI/2 | 1 |
| 3 | BSI | BSI/4 | 3 |
| 4 | BSI | BSI/8 | 7 |

What is claimed is:

1. A multi-carrier transmission system comprising a first and a second transceiver, each of said transceivers having a receiver and a transmitter, wherein data is transmitted between said transceivers by modulating said data onto a multiplicity of carrier waves in the form of multi-bit symbols, wherein each carrier wave constitutes a channel, and wherein the number of bits per symbol, varies between channels and, within a channel, with time, so that each channel has associated therewith a bit loading parameter, characterized in that, in operation, said multi-carrier system is adapted to synchronously update, at said first and second transceivers, the bit loading parameters associated with each channel by transmission of data over a control channel, in that said control channel is established, at system start-up that includes activation of said multi-carrier system, on a predetermined one of said multiplicity of carrier waves whose identity is known to said first and second transceivers, said first and second transceivers for performing the following booting said transmitter and continuously transmitting frames in which all carrier waves other than said predetermined wave are modulated with random data, said transmitter also transmitting a system heartbeat, booting said receiver and initiating channel equalization, synchronizing clocks in said first and second transceivers, and establishing said control channel on said predetermined carrier wave on receipt of the system heartbeat, transferring said control channel to a carrier wave selected by said multi-carrier system and enabling bit loading control, and enabling all carrier waves, and in that said control channel is, after start-up, changed from said predetermined channel to a further channel, selected by said first transceiver on the basis of channel characteristics.

2. A multi-carrier transmission system, as claimed in claim 1, characterized in that decisions relating to changes in bit loading and control channel selection are initiated by said first transceiver transmitting command signals over said control channel, in that said second transceiver effects changes in bit loading and control channel carrier wave selection, and in that said second transceiver measures changes in channel characteristics and forwards data relating thereto over said control channel to said first transceiver.

3. A multi-carrier transmission system, as claimed in claim 1, characterized in that said multi-carrier transmission system is a DMT transmission system.

4. A multi-carrier transmission system, as claimed in claim 3, characterized in that said predetermined carrier wave is selected from said multiplicity of carrier waves on the basis of channel SNR characteristics so that said control channel is subject to minimal interference from noise.

5. A multi-carrier transmission system, as claimed in claim 1, characterized in that said multicarrier transmission system is a DMT-based VDSL system.

6. A multi-carrier transmission system, as claimed in claim 1, characterized in that said multicarrier transmission system is a DMT-based ADSL system.

7. A multi-carrier system, as claimed in claim 1, characterized in that said step of transferring said control channel includes, in said first transceiver:

receiving data, by the transmitter, relating to measured channel characteristics from receivers in both said first and second transceivers;

selecting a carrier wave to which said control channel is to be reallocated by said transmitter;

transmitting, by said transmitter, a signal identifying said carrier wave, to which said control channel is to be reallocated, to said second transceiver;

on receipt of a confirmation signal, from said second transceiver, said transmitter terminating said control channel on said predetermined carrier wave;

said transmitter starting said control channel on the reallocated carrier wave at a heartbeat;

said receiver measuring channel characteristics and transmitting data relating thereto to said transmitter in said first transceiver;

said receiver equalizing said measured channel;

said receiver obtaining a channel estimation from the second transceiver and transmitting data relating thereto to said transmitter in said first transceiver;

said receiver receiving data identifying the carrier wave for reallocation of said control channel;

said receiver receiving a confirmation signal from said second transceiver;

said receiver terminating the control channel on said predetermined carrier wave;

said receiver establishing the control channel on the reallocated carrier wave; and if said control channel cannot be established, returning to said step of establishing said control channel.

8. A multi-carrier system as claimed in claim 1, characterized in that said step of enabling all carrier waves includes, on a continuous basis, in said first transceiver:

said transmitter obtaining data relating to measured channels from receivers in both said transceivers;

said transmitter determining the bit loading parameter for each carrier wave;

said transmitter transmitting data relating to the bit loading parameter to said second transceiver;

said transmitter changing the bit loading parameter on confirmation from said second transceiver;

the receiver measuring the channel characteristics of said multiplicity of channels and sending data relating to said measurements to said transmitter;

the receiver equalizing said multiplicity of channels in accordance with said measured channel characteristics;

the receiver obtaining a channel estimation from said second transceiver for each of said multiplicity of channels;

the receiver obtaining a new bit loading parameter for each of said multiplicity of channels) the receiver obtaining a confirmation signal from said second transceiver;

the receiver updating the bit loading parameters for each of the multiplicity of channels.

9. A multi-carrier transmission system, as claimed in claim 1, characterized in that channel characteristics are estimated by periodic transmission, by one of said transceivers, of a base sync frame having a predetermined content and comparing, in the other of said transceivers, the received base sync frame with a reference frame.

10. A multi-carrier transmission system, as claimed in claim 9, characterized in that said channel characteristics include attenuation, phase shifting and variance.

11. A multi-carrier transmission system, as claimed in claim 9, characterized in that said base sync frames are transmitted at base sync intervals (BSI), and said BSI is locked into said transceivers thereby enabling said transceivers to identify a frame as a sync frame.

12. A multi-carrier transmission system, as claimed in claim 11, characterized in that additional sync frames are transmitted at intervals between said base sync frames.

13. A multi-carrier transmission system, as claimed in claim 11, characterized in that said first transceiver issues commands for system reconfiguration at the start of the BSI, and in that system reconfiguration is effected at the start of the next BSI.

14. A multi-carrier transmission system, as claimed in claim 11, characterized in that said BSI is greater than twice a system transit time for the multi-carrier transmission system.

15. In a multi-carrier transmission system having a first and a second transceiver, each of said transceivers having a receives and a transmitter, wherein data is transmitted between said transceivers by modulating said data onto a multiplicity of carrier waves in the form of multi-bit symbols, wherein each of said carrier waves constitutes a channel, and wherein the number of bits per symbol, (the bit loading), varies between channels and, within a channel, with time, so that each channel has associated therewith a bit loading parameter, a method of operating a control channel characterized by:

synchronously updating, at said first and second transceivers, the bit loading parameters associated with each channel by transmission of data over the control channel;

establishing said control channel, at system start-up that includes activation of said multi-carrier system, on a predetermined one of said multiplicity of carrier waves whose identity is known to said first and second transceivers, and comprising booting said transmitter and continuously transmitting frames in which all carrier waves other than said predetermined wave are modulated with random data, said transmitter also transmitting a system heartbeat, booting said receiver and initiating channel equalization, synchronizing clocks in said first and second transceivers, and establishing said control channel on said predetermined carrier wave on receipt of the system heartbeat, transferring said control channel to a carrier wave selected by said multi-carrier system and enabling bit loading control, and enabling all carrier waves; and after start-up, changing said control channel from said predetermined channel to a further channel, selected by said first transceiver on the basis of channel characteristics.

16. A method, as claimed in claim 15, characterized by:

initiating decisions, relating to changes in bit loading and control channel selection, in said first transceiver and transmitting command signals over said control channel;

effecting changes in bit loading and control channel carrier wave selection in said second transceiver; and in said second transceiver, measuring changes in channel characteristics and forwarding data relating thereto over said control channel to said first transceiver.

17. A method, as claimed in claim 15, characterized in that said multi-carrier transmission system is a DMT transmission system.

18. A method, as claimed in claim 17, characterized by selecting said predetermined carrier wave from said multiplicity of carrier waves on the basis of channel SNR characteristics so that said control channel is subject to minimal interference from noise.

19. A method, as claimed in claim 15, characterized in that said multi-carrier transmission system is a DMT-based VDSL system.

20. A method, as claimed in claim 15, characterized in that said multi-carrier transmission system is a DMT-based ADSL system.

21. A method, as claimed in claim 15, characterized by said step of transferring said control channel including, in said first transceiver:

receiving data, by the transmitter, relating to measured channel characteristics from receivers in both said first and second transceivers;

selecting a carrier wave to which said control channel is to be reallocated by said transmitter;

transmitting, by said transmitter, a signal identifying said carrier wave, to which said control channel is to be reallocated, to said second transceiver;

on receipt of a confirmation signal, from said second transceiver, said transmitter terminating said control channel on said predetermined carrier wave;

said transmitter starting said control channel on the reallocated carrier wave at a heartbeat;

said receiver measuring channel characteristics and transmitting data relating thereto to said transmitter in said first transceiver;

said receiver equalizing said measured channel; said receiver obtaining a channel estimation from the second transceiver and transmitting data relating thereto to said transmitter in said first transceiver;

said receiver receiving data identifying the carrier wave for reallocation of said control channel;

said receiver receiving a confirmation signal from said second transceiver;

said receiver terminating the control channel on said predetermined carrier wave;

said receiver establishing the control channel on the reallocated carrier wave; and if said control channel cannot be established, returning to said step of establishing said control channel.

22. A method, as claimed in claim 15, characterized by said step of enabling all carrier waves including, on a continuous basis, in said first transceiver:

said transmitter obtaining data relating to measured channels from receivers in both said transceivers;

said transmitter determining the bit loading parameter for each carrier wave;

said transmitter transmitting data relating to the bit loading parameter to said second transceiver;

said transmitter changing the bit loading parameter on confirmation from said second transceiver;

the receiver measuring the channel characteristics of said multiplicity of channels and sending data relating to said measurements to said transmitter;

the receiver equalizing said multiplicity of channels in accordance with said measured channel characteristics;

the receiver obtaining a channel estimation from said second transceiver for each of said multiplicity of channels;

the receiver obtaining a new bit loading parameter for each of said multiplicity of channels;

the receiver obtaining a confirmation signal from said second transceiver;

the receiver updating the bit loading parameters for each of the multiplicity of channels.

23. A method, as claimed in claim 15, characterized by estimating channel characteristics by periodic transmission, by one of said transceivers, of a base sync frame having a predetermined content and comparing, in the other of said transceivers, the received sync frame with a reference frame.

24. A method, as claimed in claim 23, characterized by said channel characteristics including attenuation, phase shifting and variance.

25. A method, as claimed in claim 23, characterized by transmitting said base sync frames at base sync intervals (BSI), and locking said BSI into said transceivers thereby enabling said transceivers to identify a frame as a sync frame.

26. A method, as claimed in claim 25, characterized by transmitting additional sync frames at intervals between said base sync frames.

27. A method, as claimed in claim 25, characterized by said first transceiver issuing commands for system reconfiguration at the start of the BSI and effecting system reconfiguration at the start of the next BSI.

28. A method, as claimed in claim 25, characterized in that said BSI is greater than twice a system transit time for the multi-carrier transmission system.

* * * * *

UNITED STATES PATENT AND TRADEMARK OFFICE
CERTIFICATE OF CORRECTION

PATENT NO. : 6,865,232 B1
APPLICATION NO. : 09/147750
DATED : March 8, 2005
INVENTOR(S) : Isaksson et al.

It is certified that error appears in the above-identified patent and that said Letters Patent is hereby corrected as shown below:

Column 35, Line 30     Delete: "symbol, varies"
Insert: --symbol varies--

Column 37, Lines 1-4     Delete: "the receiver obtaining a new bit loading parameter for each of said multiplicity of channels) the receiver obtaining a confirmation signal from said second transceiver;"

Insert:
--the receiver obtaining a new bit loading parameter for each of said multiplicity of channels;
the receiver obtaining a confirmation signal from said second transceiver;--

Column 37, Line 34     Delete: "receives"
Insert: --receiver--

Signed and Sealed this

Nineteenth Day of September, 2006

JON W. DUDAS
*Director of the United States Patent and Trademark Office*